(12) United States Patent
Kinoshita et al.

(10) Patent No.: US 6,747,094 B2
(45) Date of Patent: Jun. 8, 2004

(54) HIGH IMPACT THERMOPLASTIC RESIN COMPOSITION

(75) Inventors: Hideo Kinoshita, Yokohama (JP); Ikuji Ohtani, Yokohama (JP); Takeshi Yasui, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/858,898

(22) Filed: May 17, 2001

(65) Prior Publication Data

US 2002/0037965 A1 Mar. 28, 2002

Related U.S. Application Data

(63) Continuation-in-part of application No. 09/657,410, filed on Sep. 8, 2000, now abandoned.

(30) Foreign Application Priority Data

Sep. 9, 1999 (JP) ............................................ 11-255801

(51) Int. Cl.$^7$ .......................... C08L 53/00; C08C 19/00
(52) U.S. Cl. ..................... 525/88; 525/92 R; 525/92 B; 525/92 C; 525/92 E; 525/95; 525/98; 525/191; 525/217; 525/231; 525/240; 525/241
(58) Field of Search ................................ 525/88, 92 R, 525/92 B, 92 C, 92 E, 95, 98, 191, 217, 231, 240, 241

(56) References Cited

U.S. PATENT DOCUMENTS

| 5,416,163 A | * | 5/1995 | Coolbaugh et al. ............ 525/98 |
| 5,550,190 A | * | 8/1996 | Hasegawa et al. ......... 525/92 A |
| 5,574,105 A | | 11/1996 | Venkataswamy |
| 5,597,867 A | * | 1/1997 | Tsujimoto et al. ............ 525/74 |

* cited by examiner

*Primary Examiner*—Jeffrey Mullis
(74) *Attorney, Agent, or Firm*—Birch, Stewart, Kolasch & Birch, LLP

(57) ABSTRACT

A high-impact thermoplastic resin composition comprising:

(A) 5 to 95 parts by weight of a thermoplastic elastomer comprising a partially or completely crosslinked saturated rubber-like polymer and a polyolefinic resin and/or a polystyrene-based resin, or a mixture of said thermoplastic elastomer and a polyolefinic resin; and (B) 95 to 5 parts by weight of at least one thermoplastic resin selected from the group consisting of polystyrene-based resins, polyamide-based resins, polyurethane-based resins, polycarbonate-based resins, polyphenylene ether-based resins, polyester-based resins, acrylic resins, polyacetal-based resins and polyphenylene sulfide-based resins, the total of the components (A) and (B) being 100 parts by weight, wherein the amount of the saturated rubber-like polymer in the composition is 1 to 40% by weight.

14 Claims, No Drawings

HIGH IMPACT THERMOPLASTIC RESIN COMPOSITION

CROSS-REFERENCE TO RELATED APPLICATION

This application is a continuation-in-part of copendig U.S. application Ser. No. 09/657,410 filed on Sep. 8, 2000, now abandoned the content of which is incorporated herein in its entirety by reference.

BACKGROUND OF THE INVENTION

(1) Field of the Invention

The present invention relates to a high-impact thermoplastic resin composition comprising a partially or completely crosslinked saturated rubber-like polymer and a thermoplastic resin. More particularly, it relates to a high impact thermoplastic resin composition comprising a thermoplastic elastomer and a thermoplastic resin, said thermoplastic elastomer comprising a partially or completely crosslinked saturated rubber-like polymer and a polyolefinic resin and/or a polystyrene-based resin, and said thermoplastic resin being a polystyrene-based resin, polyamide-based resin, polyester-based resin or the like.

(2) Description of the Related Art

Many resins such as polystyrene-based resins, polycarbonate-based resins, polyamide-based resins and polyester-based resins are known as hard thermoplastic resins. These resins are widely used as material for a variety of commercial products such as domestic electrical appliances, automobiles, food containers, packages, information-related devices and buildings. However, many of these resins, when used singly, are low in impact resistance and have a limitation in their field of application. For instance, polystyrene (PS), which is one of the polystyrene-based resins, is favorably used for the said purposes because of its high rigidity and good moldability, but polystyrene per se is fragile and its use is limited. Therefore, its impact resistance improved version, i.e. high-impact polystyrene (HIPS), is more popularly used. In this high-impact polystyrene, its rubber component needs to be crosslinked for affording stabilized high impact resistance irrespective of molding conditions. In production of ordinary high-impact polystyrene, polybutadiene is used as rubber component because rubber can not be crosslinked unless it has double bond in the molecule. The material reinforced with rubber having double bond in the molecular is poor in weather resistance as its rubber component is subject to light deterioration. HIPS, therefore, has the disadvantage of being incapable of outdoor use, for instance use as building material. Styrene-acrylonitrile-butadiene (ABS) resin, which is one of polystyrene-based resins, is also known as high impact resin, but this resin has the same problems as HIPS—very bad weather resistance and incapability of outdoor use—because of use of polybutadiene as rubber component. Polycarbonate-based resins are credited with high impact resistance, and certainly their molded articles small in thickness show high impact resistance, but impact resistance lowers as thickness of the molded article increases. Therefore, in application of polycarbonate-based resins as a molding material, they are usually alloyed with ABS resin, although such alloying is also purposed to improve fluidity of polycarbonate resins. This material, too, involves the above problems because of use of ABS resin. In these circumstances, request has been rising for a high impact material with excellent weather resistance in certain uses, especially in use for building materials.

SUMMARY OF THE INVENTION

In view of the above circumstances, the present invention is envisaged to provide a high impact thermoplastic resin with excellent weather resistance.

In the course of studies pursued for attaining the above object, the present inventors found that a high-impact thermoplastic resin with excellent weather resistance can be obtained by forming an alloy of (a) a thermoplastic elastomer comprising a partially or completely crosslinked saturated rubber-like polymer and a polyolefinic resin and/or a styrene-based resin, more specifically a dynamically crosslinked thermoplastic elastomer comprising a saturated rubber-like polymer and a polyolefinic resin, a polystyrene-based resin or a polyolefinic resin/polystyrene-based resin mixture, and (b) a polystyrene-based resin such as polystyrene, poly(styrene-acrylonitrile). The present inventors further found that this alloy, which consists of a partially or completely crosslinked saturated rubber-like polymer and a polystyrene-based resin or consists of a partially or completely crosslinked saturated rubber-like polymer, a polystyrene-based resin and a polyolefinic resin, is also improved in chemical resistance when used in combination with a polystyrene-based resin and a polyolefinic resin, because of the presence of a polyolefinic resin in addition to a polystyrene-based resin. Thus, the present invention was completed. It was further found that a high-impact thermoplastic resin with excellent weather resistance can be obtained by using a resin other than polystyrene-based resins such as polystyrene and poly(styrene-acrylonitrile), for example a polycarbonate-based resin, a polyamide-based resin, a polyphenylene ether-based resin or a polyester-based resin, and forming an alloy thereof with a thermoplastic elatomer comprising a partially or completely crosslinked saturated rubber-like polymer and a polyolefinic resin and/or a styrene-based resin. The present invention has been attained on the basis of these findings.

Saturated rubber-like polymers can not be crosslinked in their molecules under the ordinary polystyrene resin producing conditions, but partial or complete crosslinkage can be attained by adding an organic peroxide in the presence of a polyolefinic resin or a polystyrene-based resin by using an extruder or other suitable means to effect dynamic crosslinking. This may be accounted for by the fact that in production of ordinary impact-resistant polystyrene resin, polymerization of styrene in the presence of an organic peroxide and crosslinking of a rubber-like polymer are carried out simultaneously, and when an organic peroxide necessary for crosslinking the saturated rubber-like polymer is added, it becomes impossible to control polymerization (because a run-away reaction takes place), but when dynamic crosslinking is effectuated by an extruder, as it is not accompanied by polymerization, it is possible to add an excess amount of an organic peroxide, allowing stabilized crosslinking of the saturated rubber-like polymer. According to the present invention, by making use of this dynamic crosslinking technique, a saturated rubber-like polymer is crosslinked in a polyolefinic resin or a polystyrene resin, and an alloy of this dynamically crosslinked thermoplastic elastomer and various types of thermoplastic resin is formed to realize a high-impact thermoplastic resin with excellent weather resistance.

Thus, the present invention provides a high-impact thermoplastic resin composition comprising (A) a thermoplastic elastomer comprising a partially or completely crosslinked saturated rubber-like polymer and a polyolefinic resin and/or a polystyrene-based resin, and (B) at least one thermoplastic resin selected from the group consisting of polystyrene-based resins, polyamide-based resins, polyurethane-based resins, polycarbonate-based resins, polyphenylene ether-based resins, polyester-based resins, acrylic resins, polyacetal-based resins and polyphenylene sulfide-based resins.

The thermoplastic elastomer used as component (A) in the present invention consists of a rubber moiety comprising a crosslinked rubber-like polymer and a fluid moiety comprising a polyolefinic resin and/or a polystyrene-based resin. In this case, if there exists no affinity or compatibility between the saturated rubber-like polymer and the polyolefinic resin or polystyrene-based resin forming the fluid moiety of the thermoplastic elastomer, no high interfacial strength with the saturated rubber-like polymer can be obtained, so that the molded products of the high-impact thermoplastic resin composition of the present invention are low in strength. Also, when a polyolefinic resin is used in combination with a polystyrene-based resin, if affinity or compatibility is absent between them or between these resins and the thermoplastic resin used as component (B), the molded products of the composition of the present invention tend to prove low in strength because of phase separation of said two types of resin. Usually, therefore, a compatibilizing agent (C) is incorporated in the composition. In certain combinations of resins, however, no compatibilizing agent is needed.

The thermoplastic elastomer comprising a partially or completely crosslinked saturated rubber-like polymer and a polyolefinic resin and/or a polystyrene-based resin, which is used as component (A) in the composition of the present invention, is basically the one obtained by dynamically crosslinking a saturated rubber-like polymer and a polyolefinic resin, preferably a polypropylene-based resin or a polystyrene-based resin, in the presence of a radical crosslinking agent and a crosslinking assistant by an extruder or other suitable means. In case a polypropylene-based resin is used as the fluid moiety, if the saturated rubber-like polymer to polypropylene-based resin ratio is low in this dynamic crosslinking operation, the said polymer may not be crosslinked to a required degree. This is for the reason that since polypropylene-based resin, unlike polystyrene-based resin, is of the type which is decomposed in the presence of a radical polymerization initiaitor, the crosslinking agent is consumed for the decomposition of the polypropylene resin and is hindered from being used for crosslinking of the saturated rubber-like polymer. Therefore, a polyolefinic thermoplastic elastomer with a relatively high concentration of saturated rubber-like polymer is only produced as the thermoplastic elastomer which consists of a partially or completely crosslinked saturated rubber-like polymer and a polyolefinic resin, especially a polyproplylene-based resin. On the other hand, the composition of the present invention may become a material with better solvent resistance when a greater amount of a polyolefinic resin is contained beside the one already existing in the thermoplastic elastomer in case the elastomer consists of a saturated rubber-like polymer and a polyolefinic resin, or when a polyolefinic resin is contained in case the elastomer consists of a saturated rubber-like polymer and a polystyrene-based resin. Therefore, in the composition of the present invention, a polyolefinic resin may be added to the component (A) for the purpose of compositional adjustment, in addition to a thermoplastic elastomer comprising a partially or completely crosslinked saturated rubber-like polymer and a polyolefinic resin and/or a polystyrene-based resin.

Thus, the present invention is embodied as a high-impact thermoplastic resin composition comprising:

(A) 5 to 95 parts by weight of a thermoplastic elastomer comprising a partially or completely crosslinked saturated rubber-like polymer and a polyolefinic resin and/or a polystyrene-based resin, or a mixture of said thermoplastic elastomer and a polyolefinic resin; and (B) 95 to 5 parts by weight of at least one thermoplastic resin selected from the group consisting of polystyrene-based resins, polyamide-based resins, polyurethane-based resins, polycarbonate-based resins, polyphenylene ether-based resins, polyester-based resins, acrylic resins, polyacetal-based resins and polyphenylene sulfide-based resins, the total of the components (A) and (B) being 100 parts by weight, wherein the content of the saturated rubber-like polymer in said composition is 1 to 40% by weight.

In case a compatibilizing agent is additionally used, the composition comprises, in addition to (A) and (B), (C) 0.1 to 30 parts by weight of a compatibilizing agent, the total of the components (A), (B) and (C) being 100 parts by weight, wherein the content of the saturated rubber-like polymer in said composition is 1 to 40% by weight.

The expression "a thermoplastic elastomer comprising a partially or completely crosslinked saturated rubber-like polymer and a polyolefinic resin and/or a polystyrene-based resin, or a mixture of said thermoplastic elastomer and a polyolefinic resin" for the component (A) of the composition of the present invention indicates that this component can be obtained either from a single-step process in which a thermoplastic elastomer is produced from a partially or completely crosslinked saturated rubber-like polymer and a polyolefinic resin and/or a styrene-based resin, or from a two-step process in which after the above-said operation, a polyolefinic resin is further added to said thermoplastic elastomer to prepare a mixture.

In another embodiment of the present invention where the component (B), i.e. a thermoplastic resin is used as the main component, the best use is made of the innate properties of said thermoplastic resin to provide a high-impact thermoplastic resin. Thus, in a preferred embodiment of the present invention, there is provided a high-impact thermoplastic resin composition with excellent weather resistance, comprising:

(A) 5 to 50 parts by weight of a thermoplastic elastomer comprising a partially or completely crosslinked saturated rubber-like polymer and a polyolefinic resin and/or a polystyrene-based resin, or a mixture of said thermoplastic elastomer and a polyolefinic resin; and (B) 95 to 50 parts by weight of at least one thermoplastic resin selected from the group consisting of polystyrene-based resins, polyamide-based resins, polyurethane-based resins, polycarbonate-based resins, polyphenylene ether-based resins, polyester-based resins, acrylic resins, polyacetal-based resins and polyphenylene sulfide-based resins, the total of the components (A) and (B) being 100 parts by weight, wherein the content of the saturated rubber-like polymer in said composition is 1 to 40% by weight.

In case a compatibilizing agent is additionally used, the composition comprises, in addition to (A) and (B), (C) 0.1 to 30 parts by weight of a compatibilizing agent, the total of the components (A), (B) and (C) being 100 parts by weight, wherein the content of the saturated rubber-like polymer in said composition is 1 to 40% by weight.

The thermoplastic resin composition according to the present invention is a versatile thermoplastic resin which is excellent not only in impact, weather and chemical resistance but also in coating properties and printability. This composition, therefore, can lend itself to a wide variety of uses, for example, use as material for automobile parts (bumper, interior panel, body panel, etc.), OA equipment, packages, housing, tools, daily necessaries, etc., and thus is of great benefit to the industries.

DESCRIPTION OF PREFERRED EMBODIMENTS OF THE INVENTION

The thermoplastic resin composition of the present invention is a high-utility thermoplastic resin which excels in various properties, typically in impact resistance, weather resistance, chemical resistance, coating properties and printability. This composition can be applied to a variety of uses, for example, as material for automobile parts (bumper, interior panel, body panel, etc.), OA equipment, packages, housing, tools, daily necessaries, etc., and thus contributes greatly to the benefit of the industries.

The present invention will be described in detail below.

First, the components of the composition of the present invention are explained in detail.

As the partially or completely crosslinked saturated rubber-like polymer in the component (A) of the thermoplastic resin composition of the present invention, there can be used, for example, olefin-based, styrene-based, ester-based, urethane-based, vinyl chloride-based elastomers and the like. Of these elastomers, olefin-based and styrene-based elastomers are preferred in view of properties and economy.

Examples of such olefin-based elastomers include copolymers of ethylene with α-olefins, vinyl acetate, acrylic esters such as methyl acrylate and butyl acrylate, and methacrylic esters such as methyl methacrylate, ethyl methacrylate and butyl methacrylate, and hydrogenated conjugated diene polymers which are eventually made into olefinic elastomers. An example of said hydrogenated conjugated diene polymers is hydrogenated polybutadiene. This is eventually made into an elastomer of a structure close to that of ethylene-butene-1 copolymer.

For use of these olefinic elastomers as a saturated rubber-like polymer in the component (A) of the high-impact thermoplastic resin composition of the present invention, such elastomers need to have rubber elasticity, for which they are required to have JIS A hardness of preferably 90 or less, more preferably 80 or less.

Among these olefinic elastomers, ethylene-α-olefin copolymers and hydrogenated conjugated diene polymers are most preferred as they are low in hardness, have high rubber elasticity and contribute to realizing a high-impact thermoplastic resin composition.

These ethylene-α-olefin copolymers and hydrogenated conjugated diene polymers are explained in detail below.

First, ethylene-α-olefin copolymers are described.

The ethylene-α-olefin copolymer used in the present invention is preferably one which is mainly composed of ethylene and an α-olefin having 3 to 20 carbon atoms. Examples of such $C_3$–$C_{20}$ α-olefins include propylene, butene-1, pentene-1, hexene-1, 4-methylpentene-1, heptene-1, octene-1, nonene-1, decene-1, undecene-1, dodecene-1 and the like. These α-olefins may be used either singly or as a mixture of two or more of them. A copolymeric substance may be contained as a third component. As such third component copolymeric substance, conjugated dienes such as 1,3-butadiene and isoprene, and non-conjugated dienes such as dicyclopentadiene, 1,4-hexadiene, cyclooctadiene, methylene norbornene and ethylidene norbornene can be used.

The ethylene-α-olefin copolymers (such as EPDM) using said conjugated or non-conjugated dienes are inferior to the ethylene-α-olefin copolymers using no such conjugated or non-conjugated diene in weather resistance, but they are superior to polybutadiene in weather resistance because of less diene moiety in the molecule. Therefore, the saturated rubber-like polymer in the component (A) of the composition of the present invention may include an ethylene-α-olefin copolymer using a conjugated diene and/or a non-conjugated diene as a copolymer component, but when such a conjugated or non-conjugated diene is contained, its content in the said copolymer should be not more than 50% by weight, preferably not more than 30% by weight, more preferably not more than 10% by weight. In case the saturated rubber-like polymer in the present invention is an ethylene-α-olefin copolymer using a conjugated diene and/or a non-conjugated diene as copolymerization material, such a polymer is defined as a rubber-like polymer in which the content of the conjugated diene and/or non-conjugated diene is not greater than 50% by weight.

The ethylene-α-olefin copolymer used favorably as the saturated rubber-like polymer in the component (A) is preferably one produced by using a metallocene-based catalyst.

Generally, metallocene-based catalysts are composed of a cyclopentadienyl derivative of a Group IV metal such as titanium or zirconium and a co-catalyst, and they not only show high activity as a polymerization catalyst but are also typified by the fact that the molecular weight distribution of the produced polymer is narrower than when using a Ziegler catalyst, and also distribution of the $C_3$–$C_{20}$ α-olefin used as a co-monomer in the copolymer is uniform. Therefore, the polymer produced by using a metallocene-based catalyst is more uniform in crosslinkage and shows higher rubber elasticity, consequently providing a high-impact thermoplastic resin.

In the ethylene-α-olefin copolymer used favorably as the rubber-like polymer in the component (A), the copolymerization rate of α-olefin is preferably 1 to 60% by weight, more preferably 10 to 50% by weight, most preferably 20 to 45% by weight. If the copolymerization rate of α-olefin exceeds 50% by weight, the molded product obtained from the composition of the present invention is greatly deteriorated in tensile strength and other properties. On the other hand, if the copolymerization rate is less than 1% by weight, no visible effect of improving impact resistance is produced.

Density of the ethylene-α-olefin copolymer preferably falls within the range of 0.800 to 0.900 g/cm$^3$, more preferably 0.850 to 0.900 g/cm$^3$. By using a rubber-like polymer with its density falling in said range, it is possible to obtain a molded product having excellent impact resistance.

The ethylene-α-olefin copolymer used favorably as a saturated rubber-like polymer in the component (A) in the present invention preferably has long-chain branching. The presence of such long chain branching enables decreasing the density with the same ratio (wt %) of the copolymerized α-olefin without reducing mechanical strength, thus providing a low-density, low-hardness, high-strength rubber-like polymer and consequently a high-impact molded article. Therefore, in case the saturated rubber-like polymer in the component (A) of the composition of the present invention is an ethylene-α-olefin copolymer, the number of carbon atoms of α-olefin in the copolymer is preferably 4 to 20, more preferably 6 to 20. Ethylene-octene-1 copolymer in which the number of carbon atoms of α-olefin is 8 is especially preferred as it can provide a thermoplastic resin which is easy to crosslink and also has high impact resistance.

It is desirable that the ethylene-α-olefin copolymer has a peak of melting point of DSC at or above room temperature. When the copolymer has a peak of melting point at or above room temperature, its form is stabilized and it is therefore easy to handle and has little tackiness in the temperature range-below the melting point.

The melt flow rate (MFR) of the ethylene-α-olefin copolymer used in the present invention is preferably in the range of 0.01 to 100 g/10 min (as measured under a load of 2.16 kg at 190° C.), more preferably 0.2 to 20 g/10 min. When MFR of said copolymer exceeds 100 g/10 min, its impact resistance imparting effect is unsatisfactory, and when MFR is less than 0.01 g/10 min, said copolymer has insufficient fluidity at the time of dynamic crosslinking, resulting in bad workability of the composition.

Next, hydrogenated conjugated diene polymers are described.

The hydrogenated conjugated diene polymers are ones obtained by hydrogenating conjugated dienes such as polybutadiene and polyisoprene. Of these diene polymers, hydrogenated polybutadiene is especially preferred as it is easy to produce. These hydrogenated conjugated diene polymers have 1,2-vinyl bond and 1,4-vinyl bond. The presence of both 1,2-vinyl bond and 1,4-vinyl bond in the molecule contributes to enhancing rubber elasticity while lowering glass transition temperature (Tg) to improve low-temperature properties of the composition. The content of 1,2-vinyl bond in the conjugated diene is preferably 5 to 95%, more preferably 10 to 90%. When the content of 1,2-vinyl bond is less than 5% or exceeds 95%, elastomer performance is bad and the effect of improving impact resistance of the thermoplastic resin composition of the present invention is low. The composition is also unsatisfactory in low-temperature properties.

In the hydrogenated conjugated diene polymers, the double bond based on the conjugated diene in the molecule may not necessarily be hydrogenated 100%. It needs to be hydrogenated at least 50% or more, preferably 70% or more, more preferably 90% or more, especially 95% or more. Such hydrogenation, if not 100%, is instrumental in greatly improving weather resistance. Thus, the saturated rubber-like polymer used in the present invention, when it is a hydrogenated diene polymer, is defined as a rubber-like polymer having its double bond hydrogenated at least 50% or more.

Styrene-based elastomers are described below.

Examples of the styrene-based elastomers usable in the present invention are the hydrogenated aromatic vinyl/conjugated diene block or random copolymers, and said random copolymers partly containing blocks of aromatic vinyl or blocks of hydrogenated conjugated diene. Typical examples of such conjugated diene are butadiene and isoprene. Ethylene/aromatic vinyl random copolymers can be also cited as examples of said elastomers.

The hydrogenated aromatic vinyl/conjugated diene block copolymers are the block copolymers consisting of polymer blocks (S) mainly composed of at least one aromatic vinyl compound and polymer blocks (B) mainly composed of at least one hydrogenated conjugated diene, and they have a structure of, for example, S—B, S—B—S, B—S—B—S or (S—B—)nSi.

The aromatic vinyl content of said hydrogenated aromatic vinyl/conjugated diene block or random copolymers is preferably 1 to 70% by weight, more preferably 5 to 60% by weight, even more preferably 10 to 50% by weight.

When the saturated rubber-like polymer contains an aromatic vinyl component, the fluid moiety in the thermoplastic elastomer is a polystyrene-based resin and the component (B) is a polystyrene-based resin, a higher strength is provided by using a compatibilizing agent as component (C), but a high-strength thermoplastic resin can be obtained without using a compatibilizing agent, so that it is usually not used. In case no compatibilizing agent is used, if the aromatic vinyl content of the hydrogenated aromatic vinyl/conjugated diene block or random copolymer is less than 1% by weight, the molded products obtained from the thermoplastic resin composition of the present invention are low in strength. If the aromatic vinyl content exceeds 70% by weight, elastomer performance is low and the effect of improving impact resistance of the composition is unsatisfactory.

The conjugated diene in the hydrogenated aromatic vinyl/conjugated diene block or random copolymer has 1,2-vinyl bond and 1,4-vinyl bond. The presence of both 1,2-vinyl bond and 1,4-vinyl bond in the molecule contributes to enhancing rubber elasticity while lowering glass transition temperature (Tg) to improve low-temperature properties of the composition. The content of 1,2-vinyl bond in the conjugated diene is preferably 5 to 95%, more preferably 10 to 90%. If the content of 1,2-vinyl bond is less than 5% or exceeds 95%, elastomer performance is low and the effect of improving impact resistance of the composition is insufficient. The composition is also unsatisfactory in low-temperature properties.

In the hydrogenated aromatic vinyl/conjugated diene block or random copolymer used as a saturated rubber-like polymer in the component (A) of the composition of the present invention, the double bond of the conjugated diene moiety in the molecule may not necessarily be hydrogenated 100%. The hydrogenation rate needs to be at least 50%, preferably 70% or above, more preferably 90% or above, especially 95% or above. Hydrogenation, if not 100% in its degree, conduces greatly to the improvement of weather resistance. When the saturated rubber-like polymer of the present invention is a hydrogenated aromatic vinyl/conjugated diene block or random copolymer, this polymer is defined as a rubber-like polymer having its double bond hydrogenated by at least 50%.

Hydrogenated aromatic vinyl/conjugated diene block or random copolymers can be cited as preferred examples of the styrene-based elastomer used as a saturated rubber-like polymer of component (A) of the present invention. Especially hydrogenated aromatic vinyl/conjugated diene random copolymers have high rubber elasticity, and the molded products obtained from the thermoplastic resin composition of the present invention by using said random copolymers show high impact resistance. Therefore, hydrogenated aromatic vinyl/conjugated diene random copolymers are preferably used as styrene-based elastomer.

Ethylene/aromatic vinyl random copolymers, preferably ethylene/styrene random compolymer, which are another example of the styrene-based elastomers, are a little inferior. That is, these copolymers are unsatisfactory in impact resistance at low temperatures in comparison with the hydrogenated aromatic vinyl/styrene random copolymers. This is because the hydrogenated conjugated diene moiety in the hydrogenated aromatic vinyl/conjugated diene random copolymer has 1,2-vinyl bond and 1,4-vinyl bond and is branched in this portion (olefin moiety), but the ethylene/styrene random copolymers have no branched structure. The thermoplastic resin composition of the present invention using such an ethylene/styrene random copolymer as the saturated rubber-like polymer can be used for applications where low-temperature impact resistance is not required.

The melt flow rate (MFR) of the styrene-based elastomer used in the present invention preferably falls within the range of 0.01 to 20 g/10 min (as measured at 230° C. under a load of 2.16 kg), more preferably 0.1 to 10 g/10 min. When MFR of said elastomer exceeds 20 g/10 min, its impact resistance imparting effect is unsatisfactory, and when its MFR is less than 0.01 g/10 min, its fluidity at the time of dynamic crosslinking is low, resulting in bad workability of the composition.

The saturated rubber-like polymer in the component (A) of the composition of the present invention may be a mixture of the different types of saturated rubber-like polymer, in which case it is possible to obtain a further improvement of workability.

It is essential that the saturated rubber-like polymer in the component (A) be partially or completely crosslinked in the molecule. When the polymer is crosslinked, the molded product obtained from the thermoplastic resin composition of the present invention is greatly improved in impact resistance, heat resistance, etc., as compared with the case where no such crosslinking is made. When the ratio of the crosslinked rubber-like polymer (rubber-like polymer not dissolved in the solvent) in the whole rubber-like polymers in the thermoplastic resin composition of the present invention is defined as the degree of crosslinking, it is desirable that the degree of crosslinking is 30% or more, more preferably 50% or more.

Now, thermoplastic elastomers and polyolefinic resins for compositional adjustment, which can be used as component (A) of the thermoplastic resin composition of the present invention, are explained.

As the polyolefinic resin in the component (A), there can be used polyethylene-based resins, polypropylene-based resins and mixtures thereof in broad terms.

Examples of said polyethylene-based resins include high-density polyethylenes (HDPE), low-density polyethylenes (LDPE), linear low-density polyethylenes (LLDPE), acrylic vinyl monomer/ethylene copolymers (EEA, EMMA, etc.) and vinyl acetate monomer/ethylene copolymer (EVA). Of these resins, high-density polyethylenes (HDPE), low-density polyethylenes (LDPE) and linear low-density polyethylenes (LLDPE) are especially preferred as they are available at low cost. These polyethylene-based resins may be used either singly or as a combination of two or more of them.

In case a high-density polyethylene (HDPE) is used, it is generally desirable that its density be confined within the range of 0.930 to 0.970 g/cm$^3$ and its melt flow rate (MFR) within the range of 0.05 to 100 g/10 min (as measured at 190° C. under a load of 2.16 kg). In case of using a low-density polyethylene (LDPE) or a linear low-density polyethylene (LLDPE), its density preferably falls within the range of 0.900 to 0.930 g/m$^2$ and its melt flow rate (MFR) within the range of 0.05 to 100 g/10 min (measured at 190° C. under a load of 2.16 kg). When MFR exceeds 100 g/10 min, the molded articles obtained from the composition of the present invention are poor in mechanical strength and heat resistance, and when MFR is less than 0.05 g/10 min, no sufficient fluidity is provided, resulting in bad molding workability of the composition.

The polypropylene-based resins usable in the present invention include homopolypropylene and copolymers (both block and random) of propylene and other α-olefins such as ethylene, butene-1, pentene-1, hexene-1, etc. The melt flow rate (MFR) of polypropylene-based resins is preferably in the range of 0.1 to 100 g/10 min (measured at 230° C. under a load of 2.16 kg). When MFR exceeds 100 g/10 min, the molded product obtained from the composition of the present invention is poor in mechanical strength and heat resistance, and when MFR is less than 0.1 g/10 min, no satisfactory fluidity is provided, resulting in bad molding workability of the composition in its molding operation.

As explained above, polyolefinic resin used in the present invention comprises a polyethylene-based resin and/or a polypropylene-based resin. Polypropylene-based resins are preferred because of high heat resistance as compared with polyethylene-based resins. Homopolypropylene is more preferred as it shows highest heat resistance. Homopolypropylene, however, is usually susceptible to oxidative destruction and tends to lower in mechanical strength with drop of its molecular weight in long-time use. Polyethylene-based resins, on the other hand, are usually proof against oxidative destruction and ready to crosslink to maintain or improve mechanical strength. Therefore, in case a polypropylene-based resin is used, especially in applications where durability is required, homopolypropylene is used in combination with a polyethylene-based resin, or a propylene/ethylene random or block polymer is used.

The kind of the polyolefinic resin in the thermoplastic elastomer and the kind of the polyolefinic resin for compositional adjustment may be the same or different.

Polystyrene-based resins usable in the thermoplastic elastomer (component (A)) are explained below.

Polystyrene-based resins are basically polymers of styrene monomers, i.e. polystyrenes, or copolymers of styrene monomers and other monomers. Examples of the monomers to be copolymerized with styrene monomers include styrene-based monomers such as α-methylstyrene, p-chlorostyrene and p-bromostyrene, 2,4,5-tribromostyrene, unsaturated nitrile-based monomers such as acrylonitrile and methacrylonitrile, acrylic ester-based monomers such as methyl acrylate and butyl acrylatel, methacrylic ester monomers such as methyl methacrylate and ethyl methacrylate, acid anhydride monomers such as maleic anhydride and itaconic anhydride, maleimide-based monomers such as maleimide, N-methylmaleimide and N-phenylmaleimide, and organic acid monomers such as acrylic acids and methacrylic acids. Of these monomers, polystyrene is the most preferred because of low cost. Polystyrene-based resins comprising copolymers of styrene monomers and acrylic or methacrylic ester monomers are preferred as the molded articles obtained from the composition of the present invention are prominently improved in weather resistance.

The thermoplastic resins usable as component (B) are now explained.

The thermoplastic resins usable as component (B) in the present invention include polystyrene-based resins, polyamide-based resins, polycarbonate-based resins, polyphenylene ether-based resins, polyester-based resins, acrylic resins, polyacetal-based resins and polyphenylene sulfide-based resins.

Polystyrene-based resins can be identical with those used in the thermoplastic elastomer of component (A) mentioned above. Polystyrene-based resin used as component (B) and the one in the thermoplastic elastomer as component (A) may be of the same type or the different types.

Polyamide-based resins include nylon 6, nylon 6,6, nylon 11, nylon 12 and their mixtures and copolymers.

Polyester-based resins include PET (terephthalic acid/ethylene glycol copolymer), PTT (terephthalic acid/trimethylenediol copolymer) and PBT (terephthalic acid/butanediol copolymer), and polyacetal-based resins include homopolymers as well as copolymers.

These thermoplastic resins function to derive the utmost of the advantageous features of the composition of the present invention, that is, they make it possible to realize a high-impact resin composition with excellent weather resistance.

These thermoplastic resins as component (B) may be used either singly or as a mixture of two or more of them. Preferred combinations of these thermoplastic resins are, for example, polystyrene-based resin/polyphenylene ether-based resin, and polyamide-based resin/polyphenylene ether-based resin. The thermoplastic resin composition of the present invention where two of said thermoplastic resins are incorporated is a high-impact resin composition with high level of heat resistance, flame retardancy and coating performance.

In case the fluid moiety in the thermoplastic elastomer of component (A) is a polystyrene-based resin and the thermoplastic resin of component (B) is also a polystyrene-based resin, there is provided a high-impact thermoplastic resin composition comprising a partially or completely crosslinked saturated rubber-like polymer and a polystyrene-based resin.

Now, the compatibilizing agent used as component (C) of the thermoplastic resin composition of the present invention is described.

In the composition of the present invention, when a styrene-based elastomer is used as the saturated rubber-like polymer constituting the rubber moiety of the thermoplastic elastomer in the component (A), since this elastomer has styrene moiety in the molecule, it has compatibility with polystyrene-based resin only when the fluid moiety of the thermoplastic elastomer in the component (A) is a polystyrene-based resin and the component (B) is also a polystyrene-based resin. In this case, interfacial adhesion between the saturated rubber-like polymer and the polystyrene-based resin forming the fluid moiety is high, and it is possible to obtain a composition with excellent mechanical strength by using the said two components alone, without using a compatibilizing agent.

However, in case an olefinic elastomer is used as the saturated rubber-like polymer in the component (A), when a polystyrene-based resin is used as the fluid moiety of the thermoplastic elastomer in the component (A), it has no compatibility with said olefinic elastomer. Also, no compatibility is present between the thermoplastic resin of component (B) and said olefinic elastomer. Further, even in case the saturated rubber-like polymer in the component (A) is a styrene-based elastomer and the fluid moiety is a polystyrene-based resin, if the component (B) is a thermoplastic resin other than polystyrene-based resins, there is no compatibility between said styrene-based elastomer and said resins. Therefore, interfacial adhesion between the crosslinked saturated rubber-like polymer and said resins is low, resulting in a reduced mechanical strength of the composition of the present invention.

Also, when a polyolefinic resin and a polystyrene-based resin are used together as the fluid moiety of the thermoplastic elastomer, there is no compatibility between these two types of resin. Or there is no compatibility between these resins and the thermoplastic resin of component (B) (excluding the case where the fluid moiety of the thermoplastic elastomer is a polystyrene-based resin and the thermoplastic resin of component (B) is also a polystyrene-based resin). Consequently, there takes place phase separation between the different types of thermoplastic resin, causing a reduction of mechanical strength of the composition. In this case, therefore, it is necessary to use a compatibilizing agent as component (C).

As the compatibilizing agent for component (C), it is possible to use any type as far as it meets the above concept. When the expression "(two substances are) compatibilized" is used here, it means that the two substances are made to have an affinity for each other so that they can be mixed together or become reactable with each other.

The compatibilizing agents usable as component (C) in the present invention include those having in their molecule both of polyolefinic and/or polystyrene-based component and thermoplastic resin component (component B) or a component having compatibility with said thermoplastic resin. A preferred example of such compatibilizing agents is a copolymer, or a mixture of two or more types of copolymer, selected from the group consisting of A-B block copolymers, A-grafted B copolymers, B-grafted A copolymers, and copolymers in which B monomer has been randomly introduced into A polymer or A monomer has been randomly introduced into B polymer. Here, A denotes a polyolefinic component and/or a polystyrene-based component, said polyolefinic component comprising, for example, one or more polymers selected from the group consisting of polyethylenes, polypropylenes, ethylene-α-olefin copolymers mainly composed of ethylene and $C_3$–$C_{20}$ α-olefins, hydrogenated polybutadiene and hydrogenated polyisoprene, and said polystyrene-based component comprising, for example, polystyrene, a polystyrene derivative such as p-methylstyrene or a copolymer of styrene and other monomer. B denotes a polymer of the same molecular structure as component (B) or a polymer compatible with the thermoplastic resin of component (B).

The compatibilizing agents usable in the present invention are explained more particularly by taking the instance where a polystyrene-based resin is used as component (B). In case the fluid moiety of the thermoplastic elastomer of component (A) is a polyolefinic resin, there can be used as compatibilizing agent (C) those of the above-mentioned copolymers in which A is polyethylenes, polypropylenes, ethylene-α-olefin copolymers mainly composed of ethylene and $C_3$–$C_{20}$ α-olefins, hydrogenated polybutadiene, hydrogenated polyisoprene or the like, and B is polystyrenes or their copolymers, preferably polystyrene, as A-B block copolymers, A-grafted B copolymers or B-grafted A copolymers. It is also possible to use copolymers in which B has been randomly introduced into A polymer, more specifically those copolymers in which B monomer, viz. styrene monomer, has been randomly introduced into A polymer comprising polyethylene, or A has been randomly introduced into B polymer, more specifically, those copolymers in which A monomer, viz. ethylene monomer, has been randomly introduced into B polymer comprising polystyrene. In these copolymers, A and B may exist either singly or as a combination of two or more in the molecule.

In case component (B) is a polystyrene-based resin, there can be used as compatibilizing agent, for example, polystyrene-grafted polypropylene, styrene-conjugated diene (butadiene, isoprene, etc.) block or random copolymer, styrene-hydrogenated conjugated diene (butadiene, isoprene, etc.) block or random copolymer, and ethylene-styrene random copolymer. The styrene-hydrogenated conjugated diene block or random copolymer and ethylene-styrene random copolymer, when crosslinked, can function as a saturated rubber-like polymer in component (A) of the thermoplastic resin composition of the present invention. It is necessary that said copolymer is not crosslinked for functioning as a compatibilizing agent.

Therefore, in case component (C) is a styrene-hydrogenated conjugated diene block or random copolymer (which is also used as a saturated rubber-like polymer in component (A)), the one used for component (C) and the other used for component (A) are distinguished from each other in that the saturated rubber-like polymer in component (A) is crosslinked while that used for component (C) is not.

These compatibilizing agents also show compatibility with the olefinic elastomer or styrene-based elastomer favorably used as a saturated rubber-like polymer in the present invention.

In case component (B) is a polyamide resin, since polyamide has a functional group, the compatibilizing agent is usually selected from those having in one molecule a component miscible with the polyolefinic resin and/or the polystyrene-based resin constituting the fluid moiety of the thermoplastic elastomer in component (A) and a component reactable with polyamide. As typical examples of this type of compatibilizing agent, in case the fluid moiety of the thermoplastic elastomer in component (A) is a polyolefinic resin, there can be cited maleic anhydride-modified polypropylene and maleic anhydride-modified or epoxylated aromatic vinyl-hydrogenated conjugated diene copolymer. It is of course possible to use those having both of polyamide component and polyolefin component in one molecule. In case the fluid moiety of the thermoplastic elastomer in component (A) is a polystyrene-based resin, there can be used maleic anhydride-modified or epoxylated aromatic vinyl-hydrogenated conjugated diene copolymer, maleic anhydride modified polyphenylene ether and the like. It is of course possible to use those having both of polyamide component and polystyrene component in one molecule.

In case component (B) is a polyamide resin, use of maleic anhydride modified or epoxylated aromatic vinyl-hydrogenated conjugated diene copolymer is most desirable when compatibility with the olefinic or styrene-based elastomer as the saturated rubber-like polymer is taken into consideration.

In case component (B) is a thermoplastic resin other than polystyrene-based or polyamide-based resins, the compatibilizing agent can be selected with the same notion as in the case of using a polystyrene-based or polyamide-based resin described above.

For example, in case component (B) is a polycarbonate-based resin, when the fluid moiety of the thermoplastic elastomer in component (A) is a polyolefinic resin, there can be used as the compatibilizing agent the polyethylenes, polypropylenes, poly(ethylene-propylene), poly(ethylene-propylene-conjugated diene) and the like onto which an acrylonitrile-styrene copolymer having affinity for polycarbonates have been grafted. It is also possible to use a combination of acrylonitrile-styrene copolymer having a compositional distribution and aromatic vinyl-hydrogenated conjugated diene copolymer. In this case, the acrylonitrile-styrene copolymer having a compositional distribution is compatibilized with polycarbonate-based resin and aromatic vinyl-hydrogenated conjugated diene copolymer, and further compatibilized with aromatic vinyl-hydrogenated conjugated diene copolymer and polyolefinic resin, and thus consequently, polyolefinic resin in component (A) and polycarbonate-based resin of component (B) are compatibilized by the two-component compatibilizing agent. It is of course possible to use those having both of polycarbonate component and polyolefinic component in one molecule. When the fluid moiety of the thermoplastic elastomer in component (A) is a polystyrene-based resin, there can be used as compatibilizing agent, for example, acrylonitrile-styrene copolymer having a compositional distribution. It is of course possible to use those having both of polycarbonate component and polystyrene component in one molecule.

In case component (B) is a polyphenylene ether-based resin, when the fluid moiety of the thermoplastic elastomer in component (A) is a polyolefinic resin, since this polymer has compatibility with polystyrene-based resins, there can be used the same compatibilizing agents as employed in the case of polystyrene-based resin as component (B). When the fluid moiety of the thermoplastic elastomer in component (A) is a polystyrene-based resin, since this polystyrene-based resin basically has compatibility with polyphenylene ether-based resin, no compatibilizing agent is needed between them.

In case component (B) is a polyester-based resin, when the fluid moiety of the thermoplastic elastomer in component (A) is a polyolefinic resin, since it has affinity for acrylonitrile-styrene copolymers, there can be used as the compatibilizing agent the polyethylenes, polypropylenes, poly(ethylene-propylene), poly(ethylene-propylene-diene) and the like onto which an acrylonitrile-styrene copolymer have been grafted. When the fluid moiety of the thermoplastic elastomer in component (A) is a polystyrene-based resin, acrylonitrile-styrene copolymer and the like can be used as compatibilizing agent.

In case component (B) is a polycarbonate-based, polyphenylene ether-based or polyester-based resin, basically the compatibilizing agent displays its function when it is capable of compatibilizing the fluid moiety, i.e. polyolefinic resin or polystyrene-based resin, of the thermoplastic elastomer in component (A). This is because an olefinic or styrene-based elastomer is used as the saturated rubber-like polymer which needs to be compatibilized, too. However, when the fluid moiety of the thermoplastic elastomer is a polyolefinic resin and the saturated rubber-like polymer is a styrene-based elastomer, or when the fluid moiety of the thermoplastic elastomer is a polystyrene-based resin and the saturated rubber-like polymer is an olefinic elastomer, it may become necessary to use another compatibilizing agent.

Therefore, the above-explained compatibilizing agents may be used either singly or as a combination of two or more of them as component (C) in the thermoplastic resin composition of the present invention.

Now, the makeup of the thermoplastic resin composition of the present invention is described.

First, the composition of the thermoplastic elastomer (component (A)) comprising a partially or completely crosslinked saturated rubber-like polymer and a polyolefinic resin and/or a polystyrene-based resin is described.

In this thermoplastic elastomer, the ratio of the saturated rubber-like polymer is preferably 40 to 90% by weight, more preferably 50 to 75% by weight, even more preferably 55 to 70% by weight, and the ratio of the polyolefinic resin and/or polystyrene-based resin is preferably 10 to 60% by weight, more preferably 25 to 50% by weight, even more preferably 30 to 45% by weight. When the ratio of the saturated rubber-like polymer is less than 40% by weight, the crosslinking reaction of the saturated rubber-like polymer tends to retard in the production of the thermoplastic elastomer especially in case a polyolefinic resin is used, producing a thermoplastic elastomer with a low degree of crosslinking. Therefore, when the thermoplastic resin composition composed of such a thermoplastic elastomer and a thermoplastic resin (component (B)) is molded, the saturated rubber-like polymer is deformed in the flow direction to form a molded article with unstable performance. On the other hand, when the ratio of the saturated rubber-like polymer exceeds 90% by weight, the thermoplastic elastomer lacks in fluidity, making it unable to produce the thermoplastic resin composition of the present invention.

A third component may be added to this thermoplastic elastomer as explained below, but its amount is not included in the above-mentioned ratios.

The constitution of the thermoplastic elastomer as the component (A) in the present invention is as described above.

In the thermoplastic resin composition of the present invention, the ratios of the components (A) and (B) are as follows: the thermoplastic elastomer comprising a partially or completely crosslinked saturated rubber-like polymer and a polyolelfinic resin and/or a polystyrene-based resin or a mixture of said thermoplastic elastomer and a polyolefinic resin, which is component (A), is 5 to 95 parts by weight, and the thermoplastic resin of component (B) is 95 to 5 parts by weight. The content of the saturated rubber-like polymer in the composition is 1 to 40% by weight. Here, the total of the components (A) and (B) is supposed to be 100 parts by weight. If necessary, the composition may further comprise a compatibilizing agent as component (C), in which case the content of the saturated rubber-like polymer is 1 to 40% by weight. In case a compatibilizing agent is added, its ratio is 0.1 to 30 parts by weight. In the above calculation, the total of the components (A), (B) and (C) is supposed to be 100 parts by weight.

In case a polyolefinic resin is used with said thermoplastic elastomer as component (A), its ratio is 0 to 90 parts by weight, preferably 0 to 80 parts by weight, more preferably 0 to 45 parts by weight.

More preferably, the thermoplastic resin composition of the present invention comprises 5 to 50 parts by weight of component (A) and 50 to 95 parts by weight of component (B), wherein the ratio of the saturated rubber-like polymer is 1 to 40% by weight. A compatibilizing agent is added if necessary and in this case the saturated rubber-like polymer is 1 to 40% by weight. If the compatibilizing agent is used, its amount is 0.1 to 30 parts by weight. The reason why the above composition is preferred is that this composition can derive the maximum of the advantageous innate properties of the thermoplastic resins such as polystyrene-based resins, polyamide-based resins, etc., other than polyolefinic resins, and makes it possible to provide a high-impact resin reinforced with a partially or completely crosslinked rubber-like polymer in a thermoplastic elastomer.

In case a polyolefinic resin is additionally used as component (A), its ratio is preferably 0 to 45 parts by weight.

The thermoplastic resin compositions according to the present invention also include a composition in which the ratio of a thermoplastic elastomer comprising a partially or completely crosslinked saturated rubber-like polymer and a polyolefinic resin and/or a polystyrene-based resin, or a mixture of said thermoplastic elastomer and a polyolefinic resin, which is component (A), is 50 to 95 parts by weight; the ratio of a thermoplastic resin composing, component (B), is 5 to 50 parts by weight; and if necessary, the ratio of a compatibilizing agent, composing component (C), is 0.1 to 30 parts by weight; and the content of the saturated rubber-like polymer in the composition is 1 to 40% by weight. The material in this region of composition is a material mainly composed of a polyolefinic resin and/or a polystyrene-based rein, which includes a composition in which a polystyrene-based resin is blended with a polyolefinic resin, a composition mainly composed of a polystyrene-based resin, and a composition in which a thermoplastic resin such as polyamide-based resin, polycarbonate-based resin is blended with a polyolefinic resin and/or a polystyrene-based resin. The above-specified thermoplastic resin composition of the present invention is especially effective when a polyolefinic resin is used as main component.

Polyolefinic resins, especially polypropylene-based resins, excel in heat resistance, chemical resistance, etc., and are preferably used as material of automobile parts such as bumper. However, polypropylene-based resins per se are unsatisfactory in impact resistance, and also, as they have no polar group, such polypropylene-based resins do not adhere well to a coating such as urethane coating, applied to the automobile parts such as bumper. Therefore, a complicate process involving the steps of priming with a polymer having polar group followed by main coating thereon is required for the manufacture of bumper. The composition of the present invention, which is mainly composed of a polyolefinic resin and contains a thermoplastic resin other than polyolefinic resins, provides a material which is free of these problems. Specifically, a composition comprising 50 to 95 parts by weight of a thermoplastic elastomer comprising a partially or completely crosslinked saturated rubber-like polymer and a polyolefinic resin, or a mixture of said thermoplastic elastomer and a polyolefinic resin as component (A), 5 to 50 parts by weight of a thermoplastic resin as component (B) and 0.1 to 30 parts by weight of a compatibilizing agent as component (C) can provide an automobile part material having excellent impact resistance and capable of primer-less coating (urethane coating without priming) when a polyamide-based resin, polyurethane-based resin, polystyrene-based resin or the like is used as the thermoplastic resin of component (B). This composition of the present invention, which is mainly composed of a polyolefinic resin, with a thermoplastic resin other than polyolefinic resins being blended therewith in an amount of not more than 50 parts by weight, can be applied not only as said primer-less coating but also to a variety of other uses, for example, as a material with excellent printability.

As described above, the composition of the present invention can be embodied as industrial materials with various combinations of components, but the composition basically comprises (A) 5 to 95 parts by weight of a thermoplastic elastomer comprising a partially or completely crosslinked saturated rubber-like polymer and a polyolefinic resin and/or a polystyrene-based resin, or a mixture of said thermoplastic elastomer and a polyolefinic resin, (B) 95 to 5 parts by weight of a thermoplastic resin, and if necessary (C) 0.1 to 30 parts by weight of a compatibilizing agent, wherein the ratio of the saturated rubber-like polymer in the composition is 1 to 40% by weight. When the content of the thermoplastic elastomer of component (A) exceeds 95 parts by weight, the innate properties of the resin of component (B) can not be derived to the fullest measure. When the content of said elastomer is less than 5 parts by weight, its effect of affording impact resistance to the composition is unsatisfactory. When the content of the thermoplastic resin of component (B) is less than 5 parts by weight, it is impossible to take full advantage of the properties of this resin. When its content exceeds 95 parts by weight, the effect of imparting impact resistance by component (A) is small. This, however, does not apply where the fluid moiety of the thermoplastic elastomer in component (A) is a polystyrene-based resin and the thermoplastic resin of component (B) is also a polystyrene-based resin. When the content of the compatibilizing agent of component (C), which is added as desired, is less than 0.1 part by weight, there may take place phase separation between component (A) and component (B), resulting in reduced mechanical strength of the molded product obtained from the composition of the present invention. When the content of said compatibilizing agent exceeds 30 parts by weight, it is impossible to make full use of the effect provided by complexing of component (A) and component (B).

The ratio of the saturated rubber-like polymer in the whole composition is 1 to 40% by weight. When the ratio is less than 1% by weight, the impact resistant imparting effect of this polymer is unsatisfactory. When the ratio exceeds 40% by weight, it can no longer serve as a resin but becomes an elastomer and does not fit the purpose of use intended in the present invention.

Incidentally, U.S. Pat. No. 5,574,105 discloses a thermoplastic elastomer composition comprising (a) an engineering resin and (b) a dynamically cured olefinic thermoplastic elastomer comprising a thermoplastic olefinic polymer and an elastomeric copolymer. This US patent composition resembles the composition of the present invention in components, but they are definitely different in that the present invention provides a resin (Shore D hardness: above 50) composition while the US patent provides an elastomer (Shore D hardness: below 50) composition. They are also different in that the amount of the crosslinked rubber-like polymer contained in the whole resin is 1 to 40% by weight in the composition of the present invention while it is 50% by weight in the Examples of the US patent.

Now, the methods of producing the thermoplastic resin composition of the present invention are described.

There are several preferred methods, such as mentioned below, for producing the composition of the present invention, although the present invention is not limited to these methods.

The first method comprises heat-treating a polyolefinic resin and/or a polystyrene-based rein, a saturated rubber-like polymer, a crosslinking agent, preferably a radical polymerization initiator and a crosslinking assistant in component (A) by a double-screw extruder, Banbury mixer or the like to effect partial or complete dynamic crosslinking of the saturated rubber-like polymer to thereby obtain (I) a thermoplastic elastomer (dynamically cross-linked thermoplastic elastomer), and melting and mixing this dynamically crosslinked thermoplastic elastomer with (II) optionally a polyolefinic resin, (III) a thermoplastic resin as component (B), and (IV) optionally a compatibilizing agent as component (C) by a double-screw extruder, Banbury mixer or the like to obtain a composition of the present invention. The compatibilizing agent as component (C) may be allowed to coexist with a polyolefinic resin and/or a polystyrene-based resin in the saturated rubber-like polymer in the manufacture of the thermoplastic elastomer, provided that this compatibilizing agent will not undergo a crosslinking reaction with the crosslinking agent and crosslinking assistant. Polyolefinic resin of (II) is optionally used for the compositional adjustment. It is to be noted that in case a polyethylene-based resin is used solely as the polyolefinic resin in production of a thermoplastic elastomer, the matrix is also crosslinked and the obtained thermoplastic elastomer may not show thermoplasticity. Therefore, the polyolefinic resin used in this method is preferably composed mainly of an uncrosslinkable polypropylene-based resin or composed of a mixture of a polypropylene-based resin and a polyethylene-based resin. A composition of the present invention can be obtained by blending the pellets of components (I) to (IV), or by melting, kneading and pelletizing components (I) and (II) and blending these pellets with those of components (III) and (IV). A desired composition can also be obtained by melting, kneading and pelletizing components (I), (II) and (IV) and blending these pellets with those of component (III). It is thus possible to produce a composition of the present invention by blending the pellets of the respective components in various ways.

The second method comprises heat-treating a saturated rubber-like polymer, a polyolefinic resin and/or a polystyrene-based resin of component (A), a thermoplastic resin of component (B) and, if necessary, a compatibilizing agent of component (C), a crosslinking agent and a crosslinking assistant by a double-screw extruder, Banbury mixer or the like to effectuate partial or complete dynamic crosslinking of the rubber-like polymer. According to this method, a thermoplastic resin composition of the present invention can be produced by a single-step process. In this method, in case the optionally added compatibilizing agent of component (C) is likely to undergo a crosslinking reaction with the crosslinking agent and crosslinking assistant, the compatibilizing agent may be supplemented from an inlet opening provided at the middle of the extruder barrel. According to this second method, however, when the concentration of the saturated rubber-like polymer is low, the crosslinking efficiency of said rubber-like polymer may become too low to effect desired crosslinkage. Comparing the first and second methods, it appears that the first method is more advantageous. However, the way of production of the composition of the present invention is not limited to the specific methods as far as a composition defined in the present invention is eventually obtained.

As described above, the thermoplastic elastomer of component (A) of the composition of the present invention is produced essentially through the step of dynamic crosslinking. As the crosslinking agent in this method, there can be used organic peroxides, organic azo compounds and other radical polymerization initiators. Specific examples thereof are peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)-cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy) valerate; dialkyl peroxides such as di-t-butylperoxide, dicumyl peroxide, t-butylcumyl peroxide, α, α'-bis(t-butylperoxy-m-isopropyl)benzene, α, α'-bis(t-butylperoxy)-diisopropylbenzene 2,5-dimethyl-2,5-bis(t-butylperoxy)hexane and 2,5-dimethyl-2,5-bis(t-butylperoxy)hexyne-3; diacyl peroxides such as acetyl peroxide, isobutyl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-tolyoyl peroxide; peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di (benzoylperoxy) hexane, t-butylperoxymaleic acid, t-butylperoxyisopropyl carbonate and cumylperoxy octate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Of these compounds, 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexine-3 are preferred.

In case of crosslinking the saturated rubber-like polymer by the above-described first or second method, a polymerization initiator such as mentioned above is used in an amount of 0.02 to 3 parts by weight, preferably 0.05 to 1 part by weight per 100 parts by weight of the saturated rubber-like polymer. The level of crosslinking is mostly decided by the amount of the initiator used. When the initiator amount is less than 0.02 part by weight, crosslinking is insufficient. Use of the initiator in excess of 3 parts by weight does not provide a significant enhancement of crosslinking efficiency and is therefore unrecommendable.

As the crosslinking assistant, divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinonedioxime, p,p'-dibenzoylquinonedioxime, phenylmaleimide, allyl methacrylate, N,N'-m-phenylenebismaleimide, diallyl phthalate, tetraallyloxyethane, 1,2-polybutadiene and the like are preferably used. These crosslinking assistants may be used either singly or in combination.

In the present invention, a crosslinking assistant is used in an amount of 0.1 to 5 parts by weight, preferably 0.5 to 2 parts by weight, per 100 parts by weight of the saturated rubber-like polymer. When the amount of the crosslinking assistant used is less than 0.1 part by weight, the rate of crosslinking is too low. Use of the crosslinking assistant in excess of 5 parts by weight does not provide a significant improvement of the rate of crosslinking and rather has a possibility of leaving superfluous crosslinking assistant in the composition, and is therefore unrecommendable.

As described above, it is desirable to use a crosslinking agent and a crosslinking assistant for effecting the desired crosslinkage. It is possible to use other types of crosslinking agent than those mentioned above, such as phenol resins and bismaleimides.

As means for effecting partial or complete crosslinking of the saturated rubber-like polymer in component (A) of the composition of the present invention, there can be used a Banbury mixer, kneader, single-screw extruder, double-screw extruder and the like. For most efficient performance of crosslinking, a double-screw extruder is preferably used. A double-screw extruder is capable of uniformly and finely dispersing the saturated rubber-like polymer and the polyolefinic resin and/or the polystyrene-based resin and also allows prosecution of crosslinking reaction by the crosslinking agent and crosslinking assistant in a desired way, so that it is suited for continuous production of the crosslinked products.

As described above, the thermoplastic resin composition according to the present invention basically comprises: a thermoplastic elastomer comprising a partially or completely crosslinked saturated rubber-like polymer and a polyolefinic resin and/or a polystyrene-based resin, optionally a polyolefinic resin, as component (A); a thermoplastic resin as component (B); and optionally a compatibilizing agent as component (C), but the composition may also contain necessary additives, for example, softening agent, fibrous fillers such as glass fiber, carbon fiber and polyacrylonitrile fiber; metal fibers such as copper fiber and brass fiber; whiskers of such material as potassium titanate, magnesium oxysulfate and aluminum borate; powdery inorganic fillers such as talc, calcium carbonate, magnesium carbonate, silica, carbon black, titanium oxide, clay, mica, magnesium hydroxide and aluminum hydroxide; plasticizers such as polyethylene glycol and dioctyl phthalate (DOP); organic and inorganic pigments, heat stabilizer, antioxidant, ultraviolet absorber, light stabilizer, flame retardant, silicone oil, anti-blocking agent, foaming agent, antistatic agent, antibacterial agent, etc.

Of these additives, glass fiber and/or carbon fiber and talc are especially preferred as they greatly contribute to the improvement of rigidity and heat resistance of the molded products obtained from the composition of the present invention. Use of a softening agent is also preferred as it can enhance impact resistance of the composition.

In case of using glass fiber and/or carbon fiber as part of the composition of the present invention, there are roughly two types of method for molding: (a) a method usually called short fiber method, according to which glass fiber or carbon fiber (chopped strands) is mixed with the base resin and kneaded, extruded and pelletized by an extruder, and the produced pellets are injection molded; (b) a method called long fiber method in which a thermoplastic resin is side-extruded from an extruder while truing up the rovings of glass fiber or carbon fiber under tension, or alternatively a thermoplastic resin is extrusion-coated on the surface of glass fiber or carbon fiber, for example, by coating the latex containing said thermoplastic resin, then the mixture is pelletized and the pellets are directly injection molded, or these pellets are blended with the ordinary thermoplastic resin pellets containing no glass fiber or carbon fiber (said ordinary thermoplastic resin pellets may be the same as or different from the thermoplastic resin coated on glass fiber or carbon fiber), and the blend is injection molded. The molded product obtained from the long fiber method contains fibers of large lengths and has higher rigidity and strength than the products obtained from the short fiber method. In case glass fiber or carbon fiber is contained in the composition of the present invention, the content of such glass fiber or carbon fiber in the composition is 1 to 150 parts by weight, preferably 5 to 100 parts by weight, more preferably 10 to 60 parts by weight, per 100 parts by weight of components (A) and (B) combined, or in case a compatibilizing agent is used, (A), (B) and (C) combined.

It is also highly desirable to contain talc in the composition as it can greatly improve rigidity and heat resistance of the molded product. In case talc is contained in the composition, its content is 1 to 150 parts by weight, preferably 5 to 100 parts by weight, more preferably 10 to 60 parts by weight, per 100 parts by weight of components (A) and (B) combined, or in case a compatibilizing agent is used, (A), (B) and (C) combined.

In case a softening agent is used as part of the composition of the present invention, a process oil such as paraffinic or naphthenic oil can be used as the softening agent. The content of such a softening agent in the whole composition is 1 to 150 parts by weight, preferably 5 to 100 parts by weight, more preferably 10 to 60 parts by weight, per 100 parts by weight of components (A) and (B) combined, or in case a compatibilizing agent is used, (A), (B) and (C) combined.

The thus obtained thermoplastic resin composition of the present invention can be molded into various products by any appropriate molding method, such as injection molding, extrusion molding, compression molding, blow molding, calendering, expansion molding, etc.

The present invention will be explained in further detail with reference to the examples and comparative examples, but the invention is not limited to these examples. The testing methods used for the evaluation of various properties and the methods of preparing the base materials and the thermoplastic elastomers used in the following Examples and Comparative Examples are as described below.

1. Testing Methods (1) Tensile strength

Determined according to JIS K6251 at 23° C.

(2) Tensile elongation

Determined according to JIS K6251 at 23° C.

(3) Bending modulus

Determined according to JIS K6758 at 23° C.

(4) Izod impact strength

Determined according to JIS K6758 at 23° C. (V-notched, ¼ inch test)

(5) Heat resistance (HDT)

Determined according to JIS K7207.

(6) Hardness

Determined according to ASTM D2240, D type, at 23° C.

(7) Weather resistance

Evaluated by retention of Izod impact strength after the lapse of 500 hours, using a sunshine weatherometer (65° C., with rain)

x: retention is less than 80%; Δ; 80–90% retention; ○: more than 90% retention.

(8) Chemical resistance (oil resistance)

A 65 mm (width)×65 mm×35 mm (height) container was made by molding. Ten milliliters of coconut oil was contained in this container and heated at 110° C. for 60 minutes, and deformation of the container was measured.

x: large deformation; ○: small deformation; ⊙: no deformation.

(9) Coating properties

Urethane coating was applied to a thickness of 30 μm and baked at 80° C. for about 30 minutes. Adhesion was evaluated by the so-called cross-cut test. Namely, 1 mm wide 100 squares were formed by a cutter knife, and the number of the squares which were peeled off on stripping of the adhesive tape was counted.

"100/100" indicates that 100 out of 100 squares peeled off (no adhesion), and "0/100" shows that none (0) out of 100 squares peeled off (perfect adhesion).

(10) Degree of crosslinking 0.5 g of the crosslinked thermoplastic elastomer was refluxed in 200 ml of xylene for 4 hours. The solution was filtered by quantitative filter paper, and the residue on the filter paper was dried in vacuo and quantified, calculating the ratio of the weight of the residue to the weight of the rubber-like polymer in the crosslinked thermoplastic elastomer.

2. Base Materials (1) Rubber-like polymers (a) Ethylene-octene-1 Copolymer

Prepared by the method described in JP-A 3-163088 using a metallocene catalyst. Ethylene/octene-1 ratio of this copolymer was 72/28 (by weight) (This copolymer is called TPE-1).

(b) Ethylene-propylene-dicylcopentadiene Copolymer (1)

Prepared by the method described in JP-A 3-163088 using a metallocene catalyst. Ethylene/propylene/ dicyclopentadiene ratio of the copolymer was 50/41/9 (by weight) (This copolymer is called TPE-2).

(c) Ethylene-propylene-dicyclopentadiene Copolymer (2)

Prepared by a conventional method using a Ziegler catalyst. Ethylene/propylene/dicylcopentadiene ratio of the copolymer was 47.5/43/9.5 (by weight) (This copolymer is called TPE-3).

(d) Hydrogenated Polybutadiene

Prepared by the method described in JP-A 60-220147. The content of 1,2-vinyl bond in the polybutadiene moiety before hydrogenation was 30% by weight, and the hydrogenation rate was 99% (This polymer is called TPE-4).

(e) Hydrogenated Styrene-butadiene Random Copolymer

Prepared by a conventional method. Styrene/butadiene ratio before hydrogenation was 10/90 (by weight), the content of 1,2-vinyl bond was 21% by weight, and hydration rate was 95% (This copolymer is called TPE-5).

(f) Hydrogenated Styrene-butadiene Block Copolymer

Prepared by a conventional method. Styrene/butadiene ratio before hydrogenation was 20/80 (by weight). The content of 1,2-vinyl bond was 35% by weight and the hydrogenation rate was 90% (This copolymer is called TPE-6).

(g) Hydrogenated Styrene-isoprene Block Copolymer

SEPTON® (trade name: 2023; styrene content: 13%) produced by Kuraray Co., Ltd. was used (This copolymer is called TPE-7).

(h) Ethylene-styrene Random Copolymer

Prepared by the method described in JP-A 7-70223. Ethylene/styrene ratio in the copolymer was 30/70 (by weight) (This copolymer is called TPE-8).

(2) Polyolefinic Resins (a) Polypropylene

Isotactic homopolypropylene produced by Nippon Polyolefin KK (trade name: PM900A) was used (This polypropylene is called PP).

(b) Ethylene (E)-propylene (PP) copolymer resin

A block E-PP resin [E/PP=6/94 by weight] produced by Nippon Polyolefin KK (trade name: PM970A) was used (This resin is called EP).

(c) High-density polyethylene

SUNTEC® HD (trade name: B470) produced by Asahi Chemical Industry Co., Ltd. was used (This polyethylene is called HDPE).

(3) Styrene-based resins (a) Polystyrene produced by Asahi Chemical Industry Co., Ltd. (trade name: GP685) (This polystyrene is called PS).

(b) Impact-resistant polystyrene produced by Asahi Chemical Industry Co., Ltd. (trade name: HIPS492R) (This polystyrene is called HIPS).

(c) Poly(acrylonitrile-styrene) produced by Asahi Chemical Industry Co., Ltd. (Laboratory product: AN 8%) (This polymer is called AS).

(d) Styrene-methyl methacrylate copolymer produced as a laboratory product by Asahi Chemical Industry Co., Ltd. (methyl methacrylate 20% by weight) (This copolymer is called MS).

(e) Syrene/n-butyl acrylate copolymer produced as a laboratory product by Asahi Chemical Industry Co., Ltd. (n-butylacrylate 5% by weight) (This copolymer is called BS).

(4) Radical initiator 2,5-dimethyl-2,5-bis(t-butylperoxy)hexane produced by Nippon Yushi KK (trade name: Perhexa 25B) was used (This initiator is called POX).

(5) Crosslinking assistants (a) Divinylbenzene produced by Wako Pure Chemical Industries, Ltd. (This is called DVB).

(b) Triallyl isocyanurate produced by Nippon Kasei KK (This is called TAIC).

(6) Softening agent (paraffin oil)

DIANA process oil (trade name: PW-380) produced by Idemitsu Petrochemical Corp. was used.

(7) Thermoplastic resins
(a) Polystyrene-based resins
   Same as described in (3).
(b) Polyamide-based resins
   (i) Nylon 6 produced by Mitsubishi Engineering Plastics Corp. (trade name: 1007J) (This is called PA6).
   (ii) Nylon 6,6 produced by Asahi Chemical Industry Co., Ltd. (trade name: 1200S) (This is called PA6,6).
(c) Polyurethane-based resin
   Polyurethane (adipic acid-based) produced by Dainippon Ink and Chemicals Inc. (trade name: T-1198) (This is called PU).
(d) Polycarbonate-based resin
   Polycarbonate produced by Sumitomo Dow Co., Ltd. (trade name: CALIBRE® 13) (This is called PC).
(e) Polyphenylene ether-based resin
   XYRON® Powder produced by Asahi Chemical Industry Co., Ltd. (This is called PPE).
(f) Polyester-based resins
   (i) Recycled polyethylene terephthalate (This is called PET).
   (ii) Polybutyrene terephthalate (1401X06) produced by Toray Corp. (This is called PBT).
   (iii) Polytrimethylene terephthalate (pilot plant product) (This is called PTT).
(7) Compatibilizing agents
(a) Hydrogenated styrene-butadiene block copolymer
   TUFTEC® (styrene content: 60%) produced by Asahi Chemical Industry Co., Ltd. (This is called HTR).
(b) Styrene-grafted polypropylene
   MODIPER® (styrene content: 30%) (trade name: A3100) produced by Nippon Yushi KK (This is called SGP).
(c) Ethylene-styrene random copolymer
   Prepared by the method of JP-A 7-700223. Ethylene/styrene=40/60 (by weight) (This is called
(d) Maleic anhydride modified polypropylene
   ADMER® (trade name: QF305) produced by Mitsui Chemical Co., Ltd. (This is called M-PP).
(e) Epoxylated styrene/hydrogenated conjugated diene copolymer
   EPOFRIEND (trade name: A1020) produced by Daicel Chemical Industries Co., Ltd. (This is called E-HTR).
(f) Maleic anhydride-modified styrene/hydrogenated conjugated diene copolymer
   M-modified TUFTEC® (styrene content: 40%) produced by Asahi Chemical Industry Co., Ltd. (This is called M-HTR).
(g) Acrylonitrile-styrene-grafted ethylene/propylene/ conjugated diene copolymer
   ROYALTUF® (trade name: 372P20) produced by Uniroyal Chemical Co., Ltd. (This is called AS-EPDM).
3. Preparation Methods of Crosslinked Thermoplastic Elastomers
(1) TPV-1
   Using a double-screw extruder (40 mm φ, L/D=47) having a material inlet opening at the middle of the barrel and adapted with double-flighted screws having a kneading section on both sides of the material inlet opening, TPE-1, PP, POX and DVB were mixed in a ratio of 55.6/44.4/0.38/0.74 (by weight) and the mixture was melted and extruded at a cylinder temperature of 220° C. In the course of this melt extrusion, a softening agent (paraffin oil) was supplied from the material inlet opening at the middle of the barrel in an amount of 33 parts by weight per 100 parts by weight of TPE-1 and PP combined. The obtained crosslinked thermoplastic elastomer had a degree of crosslinking of 85%.

(2) TPV-2
   A crosslinked thermoplastic elastomer was produced in the same way as in (1) above except for use of a composition of TPE-1/EP/POX/DVB=69.4/30.6/0.23/0.46 (by weight) and supply of a softening agent (paraffin oil) in an amount of 42 parts by weight per 100 parts by weight of TPE-1 and EP combined. This crosslinked thermoplastic elastomer had a degree of crosslinking of 62%.
(3) TPV-3
   A crosslinked thermoplastic elastomer was produced in the same way as in (1) except for use of a composition of TPE-1/PP/HDPE/POX/DVB=55.6/33.3/11.1/0.19/0.37 (by weight) instead of TPE-1/PP/POX/DVB. It had a degree of crosslinking of 85%.
(4) TPV-4
   A crosslinked thermoplastic elastomer was produced in the same way as in (1) above except for use of a composition of TPE-2/PP/POX/DVB instead of TPE-1/PP/POX/DVB. Its degree of crosslinking was almost 100%.
(5) TPV-5
   A crosslinked thermoplastic elastomer was produced in the same way as in (1) above except for use of a composition of TPE-3/PP/POX/DVB instead of TPE-1/PP/POX/DVB. The degree of crosslinking of this elastomer was almost 100%.
(6) TPV-6
   A crosslinked thermoplastic elastomer was produced in the same way as in (1) above except for use of a composition of SEPS/PP/POX/DVB instead of TPE-1/PP/POX/DVB. This elastomer had a degree of crosslinking of about 81%.
(7) TPV-7
   A crosslinked thermoplastic elastomer was produced in the same way as in (1) except that no softening agent was supplied. This elastomer had a degree of crosslinking of 83%.
(8) TPV-8
   A crosslinked thermoplastic elastomer was produced in the same way in (7) above except that TPE-2 was used instead of TPE-1. This elastomer had a degree of crosslinking of 98%.
(9) TPV-9
   A crosslinked thermoplastic elastomer was produced in the same way as in (7) except that TPE-3 was used instead of TPE-1. This elastomer had a degree of crosslinking of 97%.
(10) TPV-10
   A crosslinked thermoplastic elastomer was produced in the same way as in (1) except for use of a composition of TPE-1/PS/HTR/POX/TAIC=65.0/35.0/5.9/0.50/1.0 (by weight) instead of TPE-1/PP/POX/DVB and supply of a softening agent (paraffin oil) in an amount of 39 parts by weight per 100 parts by weight of TPE-1 and PS combined from the material inlet port at the middle of the extruder. This elastomer had a degeee of crosslinking of 82%.
(11) TPV-11
   Pellets of a crosslinked thermoplastic elastomer were produced in the same way as in (10) except for use of a composition of TPE-1/PS/POX/TAIC=65.0/35.0/0.50/1.0 (by weight) instead of TPE-1/PS/HTR/POX/TAIC. This elastomer had a degree of crosslinking of 81%.
(12) TPV-12
   Pellets of a crosslinking thermoplastic elastomer were produced in the same way as in (10) except for use of a composition of TPE-1/PS/PP/HTR/POX/TAIC=65.0/17.5/17.5/5.9/0.50/1.0 (by weight) instead of TPE-1/PS/HTR/POX/TAIC. The degree of crosslinking of this elastomer was 72%.

(13) TPV-13

Pellets of a crosslinked thermoplastic elastomer were produced in the same way as in (10) except for use of a composition of TPE-2/PS/HTR/POX/TAIC instead of TPE-1/PS/HTR/POX/TAIC. The degree of crosslinking of this elastomer was 87%.

(14) TPV-14

Pellets of a crosslinked thermoplastic elastomer were produced in the same way as in (10) except for use of a composition of TPE-3/PS/HTR/POX/TAIC instead of TPE-1/PS/HTR/POX/TAIC. This elastomer had a degree of crosslinking of 89%.

(15) TPV-15

Pellets of a crosslinked thermoplastic elastomer were produced in the same way as in (10) except for use of a composition of TPE-4/PS/HTR/POX/TAIC instead of TPE-1/PS/HTR/POX/TAIC. This elastomer had a degree of crosslinking of 62%.

(16) TPV-16

Pellets of a crosslinked thermoplastic elastomer were produced in the same way as in (10) except for use of a composition of TPE-5/PS/POX/TAIC=65.0/35.0/0.50/1.0 (by weight) instead of TPE-1/PS/HTR/POX/TAIC. This elastomer had a degree of crosslinking of 69%.

(17) TPV-17

Pellets of a crosslinked thermoplastic elastomer were produced in the same way as in (10) except for use of a composition of TPE-6/PS/POX/TAIC=65.0/35.0/0.50/1.0 (by weight) instead of TPE-1/PS/HTR/POX/TAIC. This elastomer had a degree of crosslinking of 73%.

(18) TPV-18

Pellets of a crosslinked thermoplastic elastomer were produced in the same way as in (10) except for use of a composition of TPE-7/PS/POX/TAIC=65.0/35.0/0.50/1.0 (by weight) instead of TPE-1/PS/HTR/POX/TAIC. This elastomer had a degree of crosslinking of 75%.

(19) TPV-19

Pellets of a crosslinked thermoplastic elastomer were produced in the same way as in (10) except for use of a composition of TPE-8/PS/POX/TAIC 65.0/35.0/0.50/1.0 (by weight) instead of TPE-1/PS/HTR/POX/TAIC. This elastomer had a degree of crosslinking of 48%.

(20) TPV-20

Pellets of a crosslinked thermoplastic elastomer were produced in the same way as in (10) except for use of a composition of TPE-1/PS/SGP/POX/TAIC instead of TPE-1/PS/HTR/POX/TAIC. This elastomer had a degree of crosslinking of 82%.

(21) TPV-21

Pellets of a crosslinked thermoplastic elastomer were produced in the same way as in (10) except for use of a composition of TPE-1/PS/SESP/POX/TAIC instead of TPE-1/PS/HTR/POX/TAIC. This elastomer had a degree of crosslinking of 83%.

(22) TPV-22

Pellets of a crosslinked thermoplastic elastomer were produced in the same way as in (10) except for use of a composition of TPE-1/AS/HTR/POX/DVB=55.0/45.0/10.0/0.50/1.0 (by weight) instead of TPE-1/PS/HTR/POX/TAIC. This elastomer had a degree of crosslinking of 78%.

(23) TPV-23

A crosslinked thermoplastic elastomer was produced in the same way as in (10) except for use of a composition of TPE-1/PS/HTR/POX/TAIC=55.6/44.4/5.9/0.5/1.0 and that no softening agent was supplied. This elastomer had a degree of crosslinking of 81%.

4. Preparation Method of Non-crosslinked Thermoplastic Elastomer (1) TPO-1

The same procedure as in the preparation of TPV-1 was conducted except that the composition was devoid of POX and DVB.

EXAMPLES 1–17

Comparative Examples 1–4

Using a double-screw extruder (40 mm ϕ, L/D=47), a styrene-based resin (PS, MS or BS), a crosslinked or non-crosslinked thermoplastic elastomer, a compatibilizing agent and if necessary a polyolefinic resin for compositional adjustment were mixed at the formulations shown in Tables 1 and 2, and each mixture was kneaded, melt extruded and pelletized at a cylinder temperature of 220° C. The pellets were molded into a product by an injection molder (Toshiba IS45PNV). The properties of the molded products are shown in Tables 1 and 2. By way of comparison, HIPS was also molded under the same conditions to obtain a similar molded product. Its properties are also shown in Table 2. They are moldings composed of high-impact styrene-based resins with excellent weather and chemical resistance.

As a result of a weathering test, the sample of Example 1 suffered a slight degree of yellowing, but the samples of Examples 13 and 14 showed no sign of yellowing, indicating their excellent weather resistance.

EXAMPLES 18–20

Comparative Example 5

Using a double-screw extruder (40 mm ϕ, L/D=47), styrene-based resin (PS), PA or PU, a crosslinked thermoplastic elastomer, a compatibilizing agent and a polyolefinic resin for compositional adjustment were mixed at the formulations shown in Table 3, and each mixture was kneaded, melt extruded and pelletized at a cylinder temperature of 220° C. The obtained pellets were molded under the same conditions as in Examples 1–14 to obtain the molded products. The properties of these molded products are shown in Table 3. For comparison, a crosslinked thermoplastic elastomer and a polyolefinic resin for compositional adjustment were mixed, and the mixture was kneaded, melt extruded, pelletized and molded under the same conditions as above to obtain a molded product. Its properties are shown in Table 3. These moldings provide high-impact polypropylene-based resin with excellent coating properties.

EXAMPLES 21–32

Using a double-screw extruder (40 mm ϕ, L/D =47), various types of resin, crosslinked thermoplastic elastomer and if necessary a polyolefinic resin for compositional adjustment were mixed at the formulations shown in Table 4, and each mixture was kneaded, melt extruded and pelletized. Cylinder temperature was set at the optimal value for the resin used. The obtained pellets were set at the optimal temperature for the resin used and molded. The properties of the molded products are shown in Table 4. Izod impact strength of the resins used for the formulations were as follows: PC=170; AS=15; PA6=39; PA6,6=33; PPE=20; PET=36; PTT=47; PBT=44 (unit: J/M). Blending of a compatibilizing agent with said resins did not raise Izod impact strength, but impact resistance was greatly improved by using a single-component crosslinked thermoplastic elastomer. These molded products have high impact resistance and also excel in chemical and weather resistance as they contain a polyolefinic resin.

EXAMPLES 33–47

Comparative Example 6

Using a double-screw extruder (40 mm φ, L/D=47), a styrene-based resin (PS, MS, BS or AS), a crosslinked thermoplastic elastomer and if necessary a compatibilizing agent and a polyolefinic resin for compositional adjustment were mixed at the formulations shown in Tables 5, 6 and 7, and each mixture was kneaded, melt extruded and pelletized at a cylinder temperature of 220° C. The pellets were molded into the products by an injection molder (Toshiba IS45PNV). Properties of the molded products are shown in Tables 5, 6 and 7. In Example 37, the mixture was pelletized without kneading and melt extrusion and the pellets were injection molded.

As a result of a weathering test, the sample of Example 34 suffered a slight degree of yellowing, but the samples of Examples 50 and 51 showed no sign of yellowing, indicating their excellent weather resistance.

EXAMPLES 53–57

Using a double-screw extruder (40 mm φ, L/D=47), various types of resin, a crosslinked thermoplastic elastomer, a compatibilizing agent and if necessary a polyolefinic resin for compositional adjustment were mixed at the formulations shown in Table 8, and each mixture was kneaded, melt extruded and pelletized. Cylinder temperature was set the optimal value for the resin used. The obtained pellets were set at the optimal temperature for the resin and molded. The properties of the obtained products are shown in Table 8.

EXAMPLE 58

A 5% M-PP/95% PP preparation was side-extruded from an extruder while truing up 13 μm-size glass fiber rovings under tension, and a polyolefinic resin was extrusion-coated on the glass fiber surface. The extrudate was cut into 7 mm long pellets to produce the long-fiber pellets (which are called GF-1). The glass/polyolefinic resin ratio of these long-fiber pellets was 60/40 (by weight). The pellets of GF-1, TPV-7, PA6.6 and M-PP were mixed in a ratio of 33.3/18.0/43.7/5.0 (by weight). The composition of this mixture is as shown below. The figures in the parentheses are the values provided when the combined amount of the components (A) and (B) is supposed to be 100 (parts by weight).

| Component (A) | |
| --- | --- |
| Rubber-like polymer | 10.0 wt % (12.5 parts by weight) |
| Polyolefinic resin | 21.3 wt % (26.6 parts by weight) |
| Component (B) PA | 43.7 wt % (54.6 parts by weight) |
| Component (C) | 5.0 wt % (6.3 parts by weight) |
| Glass fiber | 20.0 wt % (25.0 parts by weight) |

The above composition was heated to 280° C. and molded by an injection molder (Toshiba IS45PNV). The molded product had the following properties: tensile strength=80 MPa; tensile elongation=4%; bending modulus=4210 MPa; Izod impact strength=286 J/M

TABLE 1

| Formulation, and composition and physical properties of molded products | Ex. 1 | Ex. 2 | Comp. Ex. 1 | Ex. 3 | Comp. Ex. 2 | Comp. Ex. 3 | Ex. 4 |
| --- | --- | --- | --- | --- | --- | --- | --- |
| Formulation | | | | | | | |
| PS | 75.2 | 47.0 | 9.4 | 77.6 | 80.0 | 75.2 | 75.2 |
| MS | | | | | | | |
| BS | | | | | | | |
| TPV-1 | 18.8 | 47.0 | 84.6 | 19.4 | 20.0 | | |
| TPV-2 | | | | | | | 18.8 |
| TPV-3 | | | | | | | |
| TPV-4 | | | | | | | |
| TPV-5 | | | | | | | |
| TPV-6 | | | | | | | |
| TPO-1 | | | | | | 18.8 | |
| HTR | 6.0 | 6.0 | 6.0 | 3.0 | 0 | 6.0 | 6.0 |
| SGP | | | | | | | |
| ESP | | | | | | | |
| Composition | | | | | | | |
| Component (A) | | | | | | | |
| Thermoplastic elastomer | | | | | | | |
| Rubber-like polymer | 7.9 (8.3) | 19.6 (22.2) | 35.4 (44.8) | 8.1 (8.5) | 8.4 (8.8) | 7.9 (8.3) non-cross linked) | 9.2 (9.7) |
| Polyolefinic resin | | | | | | | |
| PP | 6.3 (6.6) | 15.7 (17.8) | 28.3 (35.8) | 6.5 (6.8) | 6.7 (7.0) | 6.3 (6.6) | |
| EP | | | | | | | 4.0 (4.2) |
| HDPE | | | | | | | |
| Component (B) | | | | | | | |
| Polystyrene-based resin | 75.2 (78.9) | 47.0 (53.2) | 9.4 (11.9) | 77.6 (81.5) | 80.0 (84.1) | 75.2 (78.8) | 75.2 (79.7) |
| Component (C) | 6.0 (6.3) | 6.0 (6.8) | 6.0 (7.6) | 3.0 (3.2) | 0 | 6.0 (6.3) | 6.0 (6.4) |
| Softening agent (paraffin oil) | 4.7 (4.9) | 11.7 (13.3) | 21.0 (26.6) | 4.8 (5.0) | 5.0 (5.3) | 4.7 (4.9) | 5.6 (5.9) |

TABLE 1-continued

| Properties | | | | | | | |
|---|---|---|---|---|---|---|---|
| Tensile strength (MPa) | 23 | 13 | 6 | 23 | 20 | 18 | 21 |
| Tensile elongation (%) | 50 | 60 | 160 | 57 | 12 | 49 | 42 |
| Bending modulus (MPa) | 2450 | 980 | 210 | 2450 | 2550 | 2450 | 2550 |
| HDT (° C.) under high load (18.5 kg) | 82 | 74 | 44 | 82 | 81 | 79 | 81 |
| Izod impact strength (J/M) | 96 | 434 | 314 | 77 | 15 | 23 | 93 |
| MFR (g/10 min) 200° C. 5 kg | 6.5 | 8.3 | 7.8 | 6.2 | 8.9 | 7.2 | 5.9 |
| Hardness (Shore D) | 75 | 55 | 30 | 75 | 76 | 74 | 72 |
| Weather resistance | ⊚ | ⊚ | ⊚ | ⊚ | ⊚ | ⊚ | ⊚ |
| Chemical resistance | ○ | ○ | ○ | ○ | ○ | ○ | ○ |

| Formulation, and composition and physical properties of molded products | Ex. 5 | Ex. 6 | Ex. 7 | Ex. 8 | Ex. 9 | Ex. 10 | Ex. 11 |
|---|---|---|---|---|---|---|---|
| Formulation | | | | | | | |
| PS | 75.2 | 75.2 | 47.0 | 75.2 | 47.0 | 75.2 | 75.2 |
| MS | | | | | | | |
| BS | | | | | | | |
| TPV-1 | | | | | | | 18.8 |
| TPV-2 | | | | | | | |
| TPV-3 | 18.8 | | | | | | |
| TPV-4 | | 18.8 | 47.0 | | | | |
| TPV-5 | | | | 18.8 | 47.0 | | |
| TPV-6 | | | | | | 18.8 | |
| TPO-1 | | | | | | | |
| HTR | 6.0 | 6.0 | 6.0 | 6.0 | 6.0 | 6.0 | |
| SGP | | | | | | | 6.0 |
| ESP | | | | | | | |
| Composition Component (A) Thermoplastic elastomer | | | | | | | |
| Rubber-like polymer | 7.9 (8.3) | 7.9 (8.3) | 19.7 (22.3) | 7.9 (8.3) | 19.6 (22.2) | 7.9 (8.3) | 7.9 (8.3) |
| Polyolefinic resin | | | | | | | |
| PP | 4.7 (4.9) | 6.3 (6.6) | 15.7 (17.8) | 6.3 (6.6) | 15.7 (17.8) | 6.3 (6.6) | 6.3 (6.6) |
| EP | | | | | | | |
| HDPE | 1.6 (1.7) | | | | | | |
| Component (B) | | | | | | | |
| Polystyrene-based resin | 75.2 (78.8) | 75.2 (78.8) | 47.0 (53.2) | 75.2 (78.8) | 47.0 (53.2) | 75.2 (78.8) | 75.2 (78.8) |
| Component (C) | 6.0 (6.3) | 6.0 (6.3) | 6.0 (6.8) | 6.0 (6.3) | 6.0 (6.8) | 6.0 (6.3) | 6.0 (6.3) |
| Softening agent (paraffin oil) | 4.7 (4.9) | 4.7 (4.9) | 11.6 (13.1) | 4.7 (4.9) | 11.7 (13.3) | 4.7 (4.9) | 4.7 (4.9) |
| Properties | | | | | | | |
| Tensile strength (MPa) | 24 | 23 | 13 | 20 | 11 | 24 | 22 |
| Tensile elongation (%) | 51 | 50 | 60 | 60 | 65 | 52 | 32 |
| Bending modulus (MPa) | 2450 | 2450 | 11000 | 2250 | 900 | 2450 | 2350 |
| HDT (° C.) under high load (18.5 kg) | 81 | 83 | 75 | 83 | 73 | 83 | 86 |
| Izod impact strength (J/M) | 92 | 121 | 412 | 64 | 245 | 87 | 89 |
| MFR (g/10 min) 200° C. 5 kg | 7.2 | 6.0 | 8.2 | 6.2 | 8.5 | 6.1 | 5.7 |
| Hardness (Shore D) | 76 | 75 | 56 | 75 | 55 | 77 | 74 |
| Weather resistance | ⊚ | ⊚ | ○ | ⊚ | ○ | ⊚ | ○ |
| Chemical resistance | ○ | ○ | ○ | ○ | ○ | ○ | ○ |

| Formulation, and composition and physical properties of molded products | Ex. 12 | Ex. 13 | Ex. 14 |
|---|---|---|---|
| Formulation | | | |
| PS | 75.2 | | |
| MS | | 75.2 | |
| BS | | | 75.2 |
| TPV-1 | 18.8 | 18.8 | 18.8 |
| TPV-2 | | | |
| TPV-3 | | | |
| TPV-4 | | | |
| TPV-5 | | | |
| TPV-6 | | | |
| TPO-1 | | | |
| HTR | | 6.0 | 6.0 |
| SGP | | | |
| ESP | 6.0 | | |
| Composition Component (A) Thermoplastic elastomer | | | |

TABLE 1-continued

|  |  |  |  |
|---|---|---|---|
| Rubber-like polymer | 7.9 (8.3) | 7.9 (8.3) | 7.9 (8.3) |
| Polyolefinic resin |  |  |  |
| PP | 6.3 (6.6) | 6.3 (6.6) | 6.3 (6.6) |
| EP |  |  |  |
| HDPE |  |  |  |
| Component (B) |  |  |  |
| Polystyrene-based resin | 75.2 (78.8) | 75.2 (78.9) | 75.2 (78.9) |
| Component (C) | 6.0 (6.3) | 6.0 (6.3) | 6.0 (6.3) |
| Softening agent (paraffin oil) | 4.7 (4.9) | 4.7 (4.9) | 4.7 (4.9) |
| Properties |  |  |  |
| Tensile strength (MPa) | 23 | 24 | 18 |
| Tensile elongation (%) | 35 | 45 | 70 |
| Bending modulus (MPa) | 2450 | 2250 | 2060 |
| HDT(° C.) under high load (18.5 kg) | 81 | 83 | 72 |
| Izod impact strength (J/M) | 94 | 99 | 119 |
| MFR(g/10 min) 200° C. 5 kg | 9.8 | 5.1 | 6.7 |
| Hardness (Shore D) | 73 | 76 | 72 |
| Weather resistance | ○ | ○ | ○ |
| Chemical resistance | ○ | ○ | ○ |

* Figures in the parentheses are the values when (A) + (B) + (C) = 100

TABLE 2

| Formulation, and composition and physical properties of molded products | Example 15 | Example 16 | Example 17 | Comp. Example 4 |
|---|---|---|---|---|
| Formulation |  |  |  |  |
| PS | 50.0 | 41.0 | 35.0 | HIPS |
| TV-1 | 18.8 | 18.8 | 18.8 |  |
| PP | 25.2 | 34.2 | 40.2 |  |
| HTR | 6.0 | 6.0 | 6.0 |  |
| Composition |  |  |  |  |
| Composition (A) |  |  |  |  |
| (1)Thermoplastic elastomer |  |  |  |  |
| Rubber-like polymer | 7.9 (8.3) | 7.9 (8.3) | 7.9 (8.3) |  |
| Polyolefinic resin PP | 6.3 (6.6) | 6.3 (6.6) | 6.3 (6.6) |  |
| (2)Diluted poleofinic resin | 25.2 (26.4) | 34.2 (35.9) | 40.2 (42.2) |  |
| Component (B) |  |  |  |  |
| Polystyrene-based resin | 50.0 (52.4) | 41.0 (43.0) | 35.0 (36.7) |  |
| Component (C) | 6.0 (6.3) | 6.0 (6.3) | 6.0 (6.3) |  |
| Softening agent (paraffin oil) | 4.7 (4.9) | 4.7 (4.9) | 4.7 (4.9) |  |
| Properties |  |  |  |  |
| Tensile strength (MPa) | 21 | 21 | 20 | 33 |
| Tensile elongation (%) | 70 | 83 | 89 | 50 |
| Bending modulus (MPa) | 1960 | 1910 | 1760 | 2210 |
| HDT (° C.) under high load (18.5 kg) | 91 | 110 | 115 | 82 |
| Izod impact strength (J/M) | 169 | 176 | 201 | 69 |
| MFR (g/10 min) 200° C. 5 kg | 5.2 | 4.9 | 4.5 | 2.7 |
| Hardness (Shore D) | 69 | 68 | 67 | — |
| Weather resistance | ⊙ | ⊙ | ⊙ | x |
| Chemical resistance | ⊙ | ⊙ | ⊙ | x |

* Figures in the parentheses are the values when (A) + (B) + (C) = 100

TABLE 3

| Formulation, and composition and physical properties of molded products | Example 18 | Example 19 | Example 20 | Comp. Example 5 |
|---|---|---|---|---|
| Formulation |  |  |  |  |
| PS | 25.0 |  |  |  |
| PA6 |  | 18.8 |  |  |
| PU |  |  | 18.8 |  |
| TPV-7 | 36.0 | 36.0 | 36.0 | 36.0 |
| PP | 33.0 | 39.2 | 39.2 | 64.0 |
| HTR | 6.0 |  |  |  |

TABLE 3-continued

| Formulation, and composition and physical properties of molded products | Example 18 | Example 19 | Example 20 | Comp. Example 5 |
|---|---|---|---|---|
| M-PP | | 6.0 | | |
| E-HTR | | | 6.0 | |
| Composition | | | | |
| Component (A) | | | | |
| (1)Thermoplastic elastomer | | | | |
| Rubber-like polymer | 20.0 | 20.0 | 20.0 | 20.0 |
| Polyolefinic resin PP | 16.0 | 16.0 | 16.0 | 16.0 |
| (2)Diluted polyolefinic resin | 33.0 | 39.2 | 39.2 | 64.0 |
| Component (B) | 25.0 | 18.8 | 18.8 | 0 |
| Component (C) | 6.0 | 6.0 | 6.0 | 0 |
| Properties | | | | |
| Tensile strength (MPa) | 10 | 27 | 28 | 24 |
| Tensile elongation (%) | >100 | >100 | >100 | >100 |
| Bending modulus (MPa) | 710 | 1250 | 760 | 1130 |
| Izod impact strength (J/M) | 315 | 397 | 377 | 491 |
| Hardness (Shore D) | 63 | 62 | 58 | 60 |
| Cross-cut test | 0/100 | 0/100 | 0/100 | 100/100 |

TABLE 4

| Formulation, and composition and physical properties of molded products | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|---|---|---|
| Formulation | | | | | | | | | | | | |
| PC | 75.2 | | | | | | | | | | | |
| AS | | 75.2 | | | | | | | | | | |
| PA6 | | | 60.0 | 60.0 | 60.0 | | | | | | | |
| PA6,6 | | | | | | 60.0 | | | 37.6 | | | |
| PS | | | | | | | 37.6 | | | | | |
| PPE | | | | | | | 37.6 | 55.0 | 37.6 | | | |
| PET | | | | | | | | | | 75.2 | | |
| PTT | | | | | | | | | | | 75.2 | |
| PBT | | | | | | | | | | | | 75.2 |
| TPV-7 | 18.8 | 18.8 | 18.8 | | | 18.8 | 18.8 | 18.8 | 18.8 | 18.8 | 18.8 | 18.8 |
| TPV-8 | | | | 18.8 | | | | | | | | |
| TPV-9 | | | | | 18.8 | | | | | | | |
| PP | | | 15.2 | 15.2 | 15.2 | 15.2 | | 21.0 | | | | |
| HTR | 3.0 | | | | | | 6.0 | 6.0 | 3.0 | | | |
| E-HTR | | 6.0 | | | | | | | | | | |
| M-PP | | | 6.0 | 6.0 | 6.0 | 6.0 | | | 3.0 | | | |
| AS-EPDM | 3.0 | | | | | | | | | 6.0 | 6.0 | 6.0 |
| Composition | | | | | | | | | | | | |
| Component (A) | | | | | | | | | | | | |
| (1)Thermoplastic elastomer | | | | | | | | | | | | |
| Rubber-like polymer | 10.5 | 10.5 | 10.5 | 10.5 | 10.5 | 10.5 | 10.5 | 10.5 | 10.5 | 10.5 | 10.5 | 10.5 |
| Polyolefinic resin PP | 8.3 | 8.3 | 8.3 | 8.3 | 8.3 | 8.3 | 8.3 | 7.5 | 8.3 | 8.3 | 8.3 | 8.3 |
| (2)Diluted polyolefinic resin PP | | | 15.2 | 15.2 | 15.2 | 15.2 | | 21.0 | | | | |
| Component (B) | 75.2 | 75.2 | 60.0 | 60.0 | 60.0 | 60.0 | 75.2 | 55.0 | 75.2 | 75.2 | 75.2 | 75.2 |
| Component (C) | 6.0 | 6.0 | 6.0 | 6.0 | 6.0 | 6.0 | 6.0 | 6.0 | 6.0 | 6.0 | 6.0 | 6.0 |
| Properties | | | | | | | | | | | | |
| Tensile strength (MPa) | 67 | 28 | 42 | 43 | 38 | 44 | 45 | 42 | 41 | 57 | 54 | 41 |
| Tensile elongation (%) | >100 | 60 | 70 | 70 | 75 | 55 | 60 | >100 | 60 | >100 | >100 | >100 |
| Bending modulus (MPa) | 2060 | 2300 | 1530 | 1570 | 1470 | 1760 | 2060 | 1580 | 2060 | 2230 | 2080 | 1880 |
| Izod impact strength (J/M) | 399 | 80 | 169 | 168 | 119 | 142 | 176 | 216 | 209 | 119 | 125 | 128 |
| Hardness (Shore D) | 76 | 76 | 74 | 74 | 72 | 73 | 75 | 72 | 75 | 74 | 74 | 75 |
| Weather resistance | ◎ | ◎ | ◎ | ○ | ○ | ◎ | ◎ | ◎ | ◎ | ◎ | ◎ | ◎ |

TABLE 5

| Formulation, and composition and physical properties of molded products | Ex. 33 | Ex. 34 | Ex. 35 | Comp. Ex. 6 | Ex. 36 | Ex. 37 | Ex. 38 | Ex. 39 |
|---|---|---|---|---|---|---|---|---|
| Formulation | | | | | | | | |
| PS | 74.8 | 55.6 | 60.0 | 60.0 | 36.0 | 55.6 | 55.6 | 40.8 |
| TPV-10 | 20.0 | 40.0 | 40.0 | | | 40.0 | | |
| TPV-11 | | | | 40.0 | 40.0 | | 40.0 | |
| TPV-12 | | | | | | | 40.0 | 40.0 |
| PP | | | | | 19.6 | | | 14.8 |
| HTP | 5.2 | 4.4 | | | 4.4 | 4.4 | 4.4 | 4.4 |
| Composition | | | | | | | | |
| Component (A) | | | | | | | | |
| (1)Thermoplastic elastomer | | | | | | | | |
| Rubber-like polymer | 09.0 (9.5) | 18.0 (20.2) | 18.0 (20.2) | 18.7 (21.1) | 18.0 (20.2) | 18.0 (20.2) | 18.0 (20.2) | 18.0 (20.2) |
| Polystyrene-based resin | | | | | 9.6 (10.7) | 9.6 (10.8) | 4.8 (5.4) | 4.8 (5.4) |
| Polyolefinic resin PP | 4.8 (5.1) | 9.6 (10.8) | 9.6 (10.8) | 10.1 (11.3) | | | 4.8 (5.4) | 4.8 (5.4) |
| (2)Diluted polyolefinic resin PP | | | | | 19.6 (22.0) | | | 14.8 (16.6) |
| Component (B) | 74.8 (79.1) | 55.6 (62.3) | 60.0 (67.3) | 60.0 (67.6) | 36.0 (40.4) | 55.6 (62.3) | 55.6 (62.3) | 40.8 (45.7) |
| Component (C) | 6.0 (6.3) | 6.0 (6.7) | 1.6 (1.8) | — | 6.0 (6.7) | 6.0 (6.7) | 6.0 (6.7) | 6.0 (6.7) |
| Softening agent (paraffin oil) | 5.4 (5.7) | 10.8 (12.1) | 10.8 (12.1) | 11.2 (12.6) | 10.8 (12.1) | 10.8 (12.1) | 10.8 (12.1) | 10.8 (12.1) |
| Properties | | | | | | | | |
| Tensile strength (MPa) | 35 | 26 | 23 | Unable to measure because of fragility | 25 | 23 | 25 | 26 |
| Tensile elongation (%) | 45 | 55 | 52 | | 60 | 50 | 57 | 60 |
| Bending modulus (MPa) | 2720 | 2100 | 2050 | | 2000 | 2100 | 2050 | 2000 |
| HDT (° C.) under high load (18.5 kg) | 82 | 78 | 78 | | 77 | 78 | 78 | 77 |
| Izod impact strength (J/M) | 92 | 175 | 148 | | 205 | 165 | 185 | 203 |
| Hardness (Shore D) | 74 | 62 | 61 | | 57 | 62 | 60 | 58 |
| Weather resistance | ⊚ | ⊚ | ⊚ | | ⊚ | ⊚ | ⊚ | ⊚ |
| Chemical resistance | ○ | ○ | ○ | | ⊚ | ○ | ○ | ⊚ |

* Figures in the parentheses are the values when (A) + (B) + (C) = 100

TABLE 6

| Formulation, and composition and physical properties of molded products | Ex. 40 | Ex. 41 | Ex. 42 | Ex. 43 | Ex. 44 | Ex. 45 | Ex. 46 | Ex. 47 |
|---|---|---|---|---|---|---|---|---|
| Formulation | | | | | | | | |
| PS | 55.6 | 55.6 | 55.6 | 60.0 | 54.0 | 60.0 | 60.0 | 60.0 |
| TPV-13 | 40.0 | | | | | | | |
| TPV-14 | | 40.0 | | | | | | |
| TPV-15 | | | 40.0 | | | | | |
| TPV-16 | | | | 40.0 | 40.0 | | | |
| TPV-17 | | | | | | 40.0 | | |
| TPV-18 | | | | | | | 40.0 | |
| TPV-19 | | | | | | | | 40.0 |
| HTR | 4.4 | 4.4 | 4.4 | | 6.0 | | | |
| Composition | | | | | | | | |
| Component (A) | | | | | | | | |
| Thermoplastic elastomer | | | | | | | | |
| Rubber-like polymer | 18.0 (20.2) | 18.0 (20.2) | 18.0 (20.2) | 18.7 (21.1) | 18.7 (21.1) | 18.7 (21.1.) | 18.7 (21.1) | 18.7 (21.1) |
| Polystyrene-based resin | 9.6 (10.8) | 9.6 (10.8) | 9.6 (10.8) | 10.1 (11.4) | 10.1 (11.4) | 10.1 (11.4) | 10.1 (11.4) | 10.1 (11.4) |
| Component (B) | | | | | | | | |
| Polystyrene-based resin | 55.6 (62.3) | 55.6 (62.3) | 55.6 (62.3) | 60.0 (67.6) | 54.0 (60.8) | 60.0 (67.6) | 60.0 (67.6) | 60.0 (67.6) |
| Component (C) | 6.0 (6.7) | 6.0 (6.7) | 6.0 (6.7) | — | 6.0 (6.8) | — | — | — |
| Softening agent (paraffin oil) | 10.8 (12.1) | 10.8 (12.1) | 10.8 (12.1) | 11.2 (12.6) | 11.2 (12.6) | 11.2 (12.6) | 11.2 (12.6) | 11.2 (12.6) |
| Properties | | | | | | | | |
| Tensile strength (MPa) | 26 | 21 | 25 | 23 | 27 | 22 | 21 | 22 |
| Tensile elongation (%) | 56 | 50 | 58 | 50 | 55 | 52 | 50 | 30 |
| Bending modulus (MPa) | 2100 | 1900 | 2050 | 2050 | 2100 | 2100 | 1950 | 1900 |
| HDT (° C.) under high load (18.5 kg) | 78 | 78 | 77 | 75 | 75 | 78 | 78 | 78 |
| Izod impact strength (J/M) | 170 | 123 | 165 | 150 | 183 | 160 | 150 | 121 |
| Hardness (Shore D) | 60 | 62 | 59 | 61 | 60 | 62 | 63 | 65 |

TABLE 6-continued

| Formulation, and composition and physical properties of molded products | Ex. 40 | Ex. 41 | Ex. 42 | Ex. 43 | Ex. 44 | Ex. 45 | Ex. 46 | Ex. 47 |
|---|---|---|---|---|---|---|---|---|
| Weather resistance | ◯ | ◯ | ◉ | ◉ | ◉ | ◉ | ◉ | ◉ |
| Chemical resistance | ◯ | ◯ | ◯ | ◯ | ◯ | ◯ | ◯ | ◯ |

* Figures in the parentheses are the values when (A) + (B) + (C) = 100

TABLE 7

| Formulation, and composition and physical properties of molded products | Ex. 48 | Ex. 49 | Ex. 50 | Ex. 51 | Ex. 52 |
|---|---|---|---|---|---|
| Formulation | | | | | |
| PS | 55.6 | 55.6 | | | |
| MS | | | 55.6 | | |
| BS | | | | 55.6 | |
| AS | | | | | 56.7 |
| TPV-10 | | | 40.0 | 40.0 | |
| TPV-20 | 40.0 | | | | |
| TPV-21 | | 40.0 | | | |
| TPV-22 | | | | | 40.0 |
| HTR | | | | | |
| SGP | 4.4 | | 4.4 | | |
| ESP | | 4.4 | | 4.4 | |
| E-HTR | | | | | 3.3 |
| Composite | | | | | |
| Component (A) | | | | | |
| Thermoplastic elastomer | | | | | |
| Rubber-like polymer | 18.0 (20.1) | 18.0 (20.1) | 18.0 (20.1) | 18.0 (20.1) | 14.8 (16.5) |
| Polystyrene-based resin | 9.6 (10.8) | 9.6 (10.8) | 9.6 (10.8) | 9.6 (10.8) | 12.1 (13.5) |
| Component (B) | | | | | |
| Polystyrene-based resin | 55.6 (62.3) | 55.6 (62.3) | 55.6 (62.3) | 55.6 (62.3) | 56.7 (63.4) |
| Component (C) | 6.0 (6.7) | 6.0 (6.7) | 6.0 (6.7) | 6.0 (6.7) | 6.0 (6.7) |
| Softening agent (paraffin oil) | 10.8 (12.1) | 10.8 (12.1) | 10.8 (12.1) | 10.8 (12.1) | 10.5 (11.7) |
| Properties | | | | | |
| Tensile strength (MPa) | 23 | 24 | 26 | 25 | 26 |
| Tensile elongation (%) | 55 | 50 | 53 | 55 | 50 |
| Bending modulus (MPa) | 2050 | 2100 | 2000 | 1950 | 2100 |
| HDT (° C.) under high load (18.5 kg) | 78 | 78 | 79 | 75 | 78 |
| Izod impact strength (J/M) | 150 | 142 | 148 | 170 | 121 |
| Hardness (Shore D) | 60 | 61 | 62 | 60 | 63 |
| Weather resistance | ◉ | ◉ | ◉ | ◉ | ◉ |
| Chemical resistance | ◯ | ◯ | ◯ | ◯ | ◉ |

* Figures in the parentheses are the values when (A) + (B) + (C) = 100

TABLE 8

| Formulation, and composition and physical properties of molded products | Ex. 53 | Ex. 54 | Ex. 55 | Ex. 56 | Ex. 57 |
|---|---|---|---|---|---|
| Formulation | | | | | |
| PA6 | 74.0 | | | | |
| PA6,6 | | 74.0 | | | 37.0 |
| PPE | | | 74.0 | 54.0 | 37.0 |
| TPV-23 | 20.0 | 20.0 | 20.0 | 20.0 | 20.0 |
| PP | | | | 20.0 | |
| HTR | | | 6.0 | 6.0 | 3.0 |
| M-HTR | 6.0 | 6.0 | | | 3.0 |
| Component (A) | | | | | |
| (1)Thermoplastic elastomer | | | | | |
| Rubber-like polymer | 10.5 | 10.5 | 10.5 | 10.5 | 10.5 |
| Polystyrene-based resin | 8.4 | 8.4 | 8.4 | 8.4 | 8.4 |
| (2)Diluted polyolefinic resin PP | | | | 20.0 | |
| Component (B) | 74.0 | 74.0 | 74.0 | 54.0 | 74.0 |
| Component (C) | 7.1 | 7.1 | 7.1 | 7.1 | 7.1 |

TABLE 8-continued

| Formulation, and composition and physical properties of molded products | Ex. 53 | Ex. 54 | Ex. 55 | Ex. 56 | Ex. 57 |
|---|---|---|---|---|---|
| Properties | | | | | |
| Tensile strength (MPa) | 45 | 48 | 41 | 41 | 43 |
| Tensile elongation (%) | 60 | 50 | 55 | >100 | 55 |
| Bending modulus (MPa) | 1500 | 1680 | 1800 | 1520 | 2100 |
| Izod impact strength (J/M) | 151 | 140 | 185 | 230 | 210 |
| Hardness (Shore D) | 74 | 72 | 75 | 73 | 76 |
| Weather resistance | ⊙ | ⊙ | ⊙ | ⊙ | ⊙ |

What is claimed is:

1. A high-impact thermoplastic resin composition comprising:
   (A) 5 to 95 parts by weight of a thermoplastic elastomer composition comprising a partially or completely crosslinked rubbery polymer and a polyolefinic resin and/or a polystyrene-based resin and optionally a second polyolefinic resin;
   wherein organic peroxides are used as a crosslinking agent,
   wherein said rubbery polymer is selected from the group consisting of
      1) a rubbery polymer being an ethylene-α-olefin copolymer or an ethylene-α-olefin copolymer with a conjugated diene and/or a non-conjugated diene used as a copolymer component wherein the amount of said conjugated diene and/or non-conjugated diene is not more than 50% by weight based on said copolymer.
      2) a rubbery polymer being a hydrogenated diene polymer obtained by hydrogenating at least 50% of the double bond of the diene; and
      3) a rubbery polymer being a hydrogenated aromatic vinyl/conjugated diene block or random copolymer obtained by hydrogenating at least 90% of the double bond based on said conjugated diene moiety,
   (B) 95 to 5 parts by weight of at least one thermoplastic resin selected from the group consisting of polystyrene-based resins, polyamide-based resins, polyurethane-based resins, polycarbonate-based resins, polyphenylene ether-based resins, polyester-based resins, acrylic resins, polyacetal-based resins and polyphenylene sulfide-based resins; the total of the components (A) and (B) being 100 parts by weight, wherein the amount of the rubbery polymer in the composition is 1 to 40% by weight, wherein the wt % of the rubbery polymer is based on the total weight of components (A) and (B) and, if present, a compatibilizing agent (C); and wherein the high-impact thermoplastic resin composition has a Shore D hardness of at least 50.

2. A high-impact thermoplastic resin composition according to claim 1, further comprising (C) 0.1 to 30 parts by weight of a compatibilizing agent, the total of the components (A), (B) and (C) being 100 parts by weight.

3. A high-impact thermoplastic resin composition according to claim 1, comprising:
   5 to 50 parts by weight of component (A); and
   95 to 50 parts by weight of component (B).

4. A high-impact thermoplastic resin composition according to claim 3, further comprising
   (C) 0.1 to 30 parts by weight of a compatibilizing agent, the total of the components (A), (B) and (C) being 100 parts by weight.

5. A high-impact thermoplastic resin composition according to any one of claims 1 to 4, wherein said thermoplastic elastomer composition is a dynamically crosslinked thermoplastic elastomer of a saturated rubbery polymer with a polyolefinic resin, a polystyrene-based resin or a mixture of a polyolefinic resin/a polystyrene-based resin.

6. A high-impact thermoplastic resin cpmposition according to any one of claims 1 to 4, wherein said rubbery polymer is an olefinic elastomer and/or a styrene-based elastomer.

7. A high-impact thermoplastic resin composition according to claim 6, wherein said olefinic elastomer is an ethylene-α-olefinic copolymer which is composed of ethylene and an α-olefin having 3 to 20 carbon atoms.

8. A high-impact thermoplastic resin composition according to claim 7, wherein said olefinic elastomer is an ethylene-α-olefinic copolymer which is composed of ethylene and an α-olefin having 3 to 20 carbon atoms and which was polymerized by a metallocene-based catalyst.

9. A high-impact thermoplastic resin composition according to claim 7, wherein said olefinic elastomer is an ethylene-α-olefinic copolymer which is composed of ethylene and an α-olefin having 6 to 20 carbon atoms.

10. A high-impact thermoplastic resin composition according to claim 6, wherein said styrene-based elastomer is a hydrogenated aromatic vinyl/conjugated diene block or random copolymer.

11. A high-impact thermoplastic resin composition according to any one of claims 1 to 4, wherein said polyolefinic resin is mainly composed of a polypropylene-based resin.

12. A high-impact thermoplastic resin composition according to claim 2 or claim 4, wherein said compatibilizing agent is at least one copolymer selected from the group consisting of A-B block copolymers, A-grafted B copolymers, B-grafted A copolymers, and copolymers in which the monomer component of B has been randomly introduced into polymer A, or the monomer component of A has been randomly introduced into polymer B, wherein A is at least one polymer selected from the group consisting of polyethylenes, polypropylenes, ethylene-α-olefinic copolymers mainly composed of ethylene and an α-olefin having 3 to 20 carbon atoms, hydrogenated polybutadiene, hydrogenated polyisoprene and polystyrene, and B is a polymer of the same molecular structure as the thermoplastic resin of component (B), or a polymer having compatibility with the thermoplastic resin of component (B).

13. A fiber-reinforced high-impact thermoplastic resin composition according to any one of claims 1 to 4, wherein said composition contains glass fiber or carbon fiber in an amount of 1 to 150 parts by weight per 100 parts by weight of the combined amount of components (A) and (B) or components (A), (B) and (C).

14. A high-impact thermoplastic resin composition according to any one of claims 1–4, wherein said rubbery polymer is a rubbery polymer being an ethylene-α-olefin copolymer or an ethylene-α-olefin copolymer with a conjugated diene and/or a non-conjugated diene used as a copolymer component wherein the amount of said conjugated diene and/or non-conjugated diene is not more than 10% by weight based on said copolymer.

* * * * *